United States Patent
Bringer et al.

(10) Patent No.: US 10,027,654 B2
(45) Date of Patent: Jul. 17, 2018

(54) METHOD FOR AUTHENTICATING A CLIENT DEVICE TO A SERVER USING A SECRET ELEMENT

(71) Applicant: MORPHO, Issy-les-Moulineaux (FR)

(72) Inventors: Julien Bringer, Issy-les-Moulineaux (FR); Herve Chabanne, Issy-les-Moulineaux (FR); Olivier Cipiere, Issy-les-Moulineaux (FR); Rodolphe Hugel, Issy-les-Moulineaux (FR); Roch Lescuyer, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 69 days.

(21) Appl. No.: 14/881,014

(22) Filed: Oct. 12, 2015

(65) Prior Publication Data

US 2016/0105414 A1 Apr. 14, 2016

(30) Foreign Application Priority Data

Oct. 13, 2014 (FR) .................................... 14 59804

(51) Int. Cl.
| | |
|---|---|
| *H04L 29/06* | (2006.01) |
| *H04L 9/00* | (2006.01) |
| *H04L 9/32* | (2006.01) |

(52) U.S. Cl.
CPC ............ *H04L 63/083* (2013.01); *H04L 9/008* (2013.01); *H04L 9/3218* (2013.01);
(Continued)

(58) Field of Classification Search
CPC .............................. H04L 9/008; H04L 9/3218
(Continued)

(56) References Cited

U.S. PATENT DOCUMENTS

| | | | | |
|---|---|---|---|---|
| 2007/0204078 A1* | 8/2007 | Boccon-Gibod | ....... | G06F 21/10 710/54 |
| 2011/0265159 A1* | 10/2011 | Ronda | ................. | H04L 63/0853 726/6 |
| 2013/0067552 A1* | 3/2013 | Hawkes | ................ | H04L 63/166 726/7 |

FOREIGN PATENT DOCUMENTS

WO WO-2008022158 A2 * 2/2008 ........... H04L 9/3218

OTHER PUBLICATIONS

French Search Report, dated Jun. 16, 2015, French Application No. 1459804.

(Continued)

*Primary Examiner* — Hadi S Armouche
*Assistant Examiner* — Khalil Naghdali
(74) *Attorney, Agent, or Firm* — Womble Bond Dickinson (US) LLP

(57) ABSTRACT

The invention relates to an authentication method for authenticating a client device having an authentication token generated by means of a pseudo-homomorphic function and based on a secret element (PIN) known only by the client device, to a server, comprising:

the generation (A1), by the client device, of proof of knowledge of the secret element based on a proof generation key masked with a first mask data item, said masked proof generation key being dependent on said secret element, the transmission to the server by the client device, of said generated proof of knowledge of the secret element (A2) and of the authentication token (J) masked using the mask data item (A3), the verification of the validity of the masked authentication token (A4) and of the validity of the proof of knowledge by the server (A6) by a zero-knowledge (Continued)

proof, proving the knowledge of said secret element by the client device without revealing it.

30 Claims, 10 Drawing Sheets

(52) U.S. Cl.
CPC .......... *H04L 9/3221* (2013.01); *H04L 9/3226* (2013.01); *H04L 9/3247* (2013.01)

(58) Field of Classification Search
USPC ........................................................ 713/176
See application file for complete search history.

(56) References Cited

OTHER PUBLICATIONS

Herbst, Christoph, et al., "An AES Smart Card Implementation Resistant to Power Analysis Attacks", *Applied Cryptography and Network Security Lecture Notes in Computer Science*, (Jan. 1, 2006), 239-252.

Yang, Yanjiang, et al., "A New Approach for Anonymous Password Authentication", *Computer Security Applications Conference*, (Dec. 7, 2009), 199-208.

* cited by examiner

METHOD FOR AUTHENTICATING A CLIENT DEVICE TO A SERVER USING A SECRET ELEMENT

FIELD OF THE INVENTION

This invention relates in a general manner to the authentication of a client to a server.

The invention more particularly relates to a secure authentication method using a secret element protected against server or client tampering.

PRIOR ART

Within the scope of existing authentication methods, a client generally provides a server with proof of its identity by sending a secret element specific to itself, such as a password or PIN code. In order to verify the validity of the secret element sent by a client, the server can store, possibly in an encoded manner, the secret elements of the clients enrolled with it.

In the event that the server is compromised, an attacker accessing the former's memory could gain knowledge of the secret elements stored in an unencrypted form and use them fraudulently to pose to servers as the clients whose secret element he/she has acquired. In the event of storage in an encrypted form, use of the memory's contents by an attacker is more difficult, however is not impossible. Moreover, the secret element of a client can appear in an unencrypted form in the memory of the server during its authentication. The spying of the contents of the server's memory by an attacker during the execution of the authentication process therefore allows the attacker to gain knowledge of the secret element of the client being authenticated.

In order to make the authentication process insensitive to server tampering, certain methods suggest storing the secret element of the user in the client memory and locally verifying knowledge of this secret element by the user. Nonetheless, such methods are sensitive to the tampering of the client memory, all the more so as the latter is generally a thin piece of equipment, such as a mobile phone or a personal computer, often less secure than equipment such as a corporate data server.

Furthermore, the existing authentication methods can be sensitive to replay attacks wherein an attacker re-uses data previously transmitted by a client and poses as this client to a server. This data can, for example, have been acquired by a "man-in-the-middle"-type attack, whereby the attacker intercepts the communications between the client and a server.

There is thus the need for an authentication method enabling a client to prove to a server its knowledge of a secret element, while remaining insensitive to the tampering of the client's or server's memory and to replay attacks, without requiring significant computing power, which would make its implementation difficult on a client such as a mobile phone.

SUMMARY OF THE INVENTION

For this purpose and according to a first aspect, this invention therefore relates to a method for authenticating a client device to a server using a secret element known only by the client device,
said client device having an authentication token generated by means of a pseudo-homomorphic function and based on said secret element, said method comprising the following steps:

the generation, by the client device, of proof of knowledge of the secret element based on a proof generation key masked with a first mask data item, said first mask data item being a non-public, random data item known only by the client device and said masked proof generation key being dependent on said secret element, the transmission to the server by the client device, of said generated proof of knowledge of the secret element, the transmission to the server by the client device, of the authentication token masked using the first mask data item, the verification by the server of the validity of the masked authentication token received, the verification by the server of the validity of the proof of knowledge by a zero-knowledge proof, proving the knowledge of said secret element by the client device without revealing it.

The server can therefore verify that the client device does indeed have an authentication token, and that the client device has knowledge of the secret element used to generate this authentication token, without revealing the authentication token thanks to the use of the first mask data item.

In one embodiment of the method according to the first aspect, this method can further comprise an acquisition step for acquiring, by the server, a proof verification key associated with said proof generation key. The verification step for verifying the validity of the proof of knowledge therefore comprises a verification by the server of the validity of the proof of knowledge using the proof verification key acquired. According to an alternative embodiment, the server verifies the validity of the proof of knowledge based on the masked authentication token received.

Such an authentication token can comprise an encryption token acquired by encryption based on said secret element using a pseudo-homomorphic encryption function.

In one embodiment of the method according to the first aspect, the authentication token further comprises a signature token corresponding to the result of the signature of the encryption token using a pseudo-homomorphic signature function, the transmission step for transmitting the masked authentication token comprises the transmission, by the client device to the server, of the encryption token held, masked using the first mask data item, and the transmission, by the client device to the server, of the signature token held, masked using the first mask data item;

the verification step for verifying the masked authentication token comprises the verification by the server, of the validity of the signature of the masked signature token received based on the masked encryption token received.

In one embodiment of the authentication method according to the first aspect:
the generation step for generating proof of knowledge of the secret element comprises the transmission of a challenge by the server to the client device, and the generation, by the client device, of a signature data item acquired by signing the received challenge using said masked proof generation key, the transmission step for transmitting, to the server by the client device, said proof of knowledge of the secret element comprises the transmission, by the client device, of said signature data item to the server.

In one embodiment of the authentication method according to the first aspect:
the transmission step for transmitting the masked authentication token comprises the transmission, by the client device to the server, of the encryption token held, masked using the first mask data item, the acquisition step for acquiring the proof verification key based on the masked authentication token received comprises the decryption, by the server, of the received masked encryption token using the pseudo-homomorphic encryption function so as to acquire a proof verification key, the verification step for verifying the validity of the proof of knowledge comprises the verification, by the server, of the validity of the signature of the received signature data item using the proof verification key acquired.

The server can therefore verify that the client device does indeed have an encryption token and the associated signature token, and that the client device has knowledge of the secret element used to generate this encryption token, without revealing the encryption token or the signature token thanks to the use of the first mask data item.

During a prior enrolment phase, said authentication method according to the first aspect can comprise the following steps:

the determination of the secret element by the client device, and the generation of the encryption and signature tokens.

In a first embodiment, during the enrolment phase, the secret element determination step can comprise the selection of the secret element by a client in possession of the client device and the encryption token generation step can comprise the generation of the encryption token by the client device.

The secret element therefore remains unknown to the server, thus protecting the authentication method against the tampering of the former's memory.

In a second embodiment, during the enrolment phase, the secret element determination step can comprise the selection of the secret element by a client in possession of the client device and the transmission of the selected secret element to the server, and the encryption and signature token generation steps can comprise the generation of the encryption token and the signature token by the server and the transmission of these tokens to the client device.

The implementation of the enrolment phase with a trusted server is therefore simplified and does not require any computation by the client device.

The encryption token generation step can comprise the calculation of a hash value of the secret element based on a hash function and the encryption of said hash using the pseudo-homomorphic encryption function.

The secret element is therefore used during the generation of the encryption token only in the form of a hash value, which limits the risk of an attacker being able to retrieve the secret element from the encryption token in the event that the memory of the client device is compromised.

In a third embodiment, the encryption token generation step can comprise the generation, by the server, of a temporary secret element, the generation of a temporary encryption token based on the temporary secret element, the transmission of the temporary secret element and of the temporary encryption token to the client device and the generation, by the client device, of an encryption token based on the temporary encryption token, the temporary secret element and the secret element, and the signature token generation step can comprise the generation, by the server, of a temporary signature token by signing the temporary encryption token, the transmission of the temporary signature token to the client device, and the generation, by the client device, of a signature token based on the temporary signature token, the temporary secret element and the secret element.

This embodiment enables the client device to acquire a secret element of its choice and the corresponding encryption and signature tokens without transmitting any of these elements to the server, thus limiting the risks of interception or re-use of this data following the tampering of the server's memory.

The generation of the temporary encryption token can comprise the calculation of a hash value of the temporary secret element based on a hash function and the encryption of said hash value using the pseudo-homomorphic encryption function.

The calculation step for calculating a hash value of a secret element can comprise the calculation of a hash value of said secret element and of at least one additional secret element based on a hash function.

This therefore requires a user looking to authenticate himself/herself, to have an additional secret element, potentially linked to a hardware element, thus further limiting the risks of identity theft.

The generation of an encryption token C based on a secret element $\sigma$ can take place using the following formula: $C=Enc(g^P)$, where g is a high-order group generator and $P=h(s, \sigma)$ where s is a random number (sel), h is a hash function, where $\sigma$ can be equal to the secret element (PIN) or to a temporary secret element, and Enc is the pseudo-homomorphic encryption function.

During the enrolment phase:

the encryption token generation step can be performed by the client device;

and the signature token generation step can comprise:

the masking of said encryption token using a second, random mask data item $\alpha$ known only by the client device, the transmission of said masked encryption token to the server;

the generation, by the server, of a second signature data item by signing the received masked encryption token using the pseudo-homomorphic signature function;

the transmission, by the server, of the second signature data item to the client device;

said signature token being acquired based on said second signature data item using the second mask data item.

This enables the server to generate a signature data item allowing the client device to acquire a signature token corresponding to its encryption token, without revealing this encryption token, thus limiting the risks of a replay attack in the event of interception of the communications between the client device and the server.

Said client device can verify the validity of the signature of said second signature data item.

This enables the detection of the potential corruption of the signature data item, regardless of whether this is the result of an error at the time of its generation or a problem during its transmission. The client device therefore ensures that the validity of the signature token acquired can be verified during the authentication phase in order to prevent a situation wherein it cannot authenticate itself due to the lack of a valid signature token.

The encryption and signature functions can be asymmetric functions.

During an initialisation phase, the authentication method according to the first aspect can comprise the implementation by the server of the following steps:

the generation of a pair of asymmetric signature keys for implementing the pseudo-homomorphic signature function;

the generation of a pair of asymmetric encryption keys for implementing the pseudo-homomorphic encryption function;

the transmission of the public encryption key of said pair of asymmetric encryption keys, and of the public signature key of said pair of asymmetric signature keys so that the client device performs the encryptions and can verify the signature tokens emitted generated by the server using said public keys and so that the server performs the decryptions and generates the signature tokens using the private keys of said pairs of asymmetric keys.

Said encryption and/or signature keys can be associated with an identifier identifying the client in possession of the client device.

Identity theft by an attacker is therefore made more difficult as the authentication will require the use of the encryption and signature tokens corresponding to the identity that he/she desires.

In a first alternative embodiment, said encryption and/or signature keys are matched with an identifier identifying the client in possession of the client device in a database.

Such an alternative embodiment enables the server to easily determine which keys to use when authenticating a certain client device.

In a second alternative embodiment, said encryption and/or signature keys are derived from a hash value of the identifier identifying the client in possession of the client device.

Such an alternative is used to maintain the secrecy of the match between the identity of a client and the associated keys, even in the event of the tampering of the server's memory.

According to another embodiment, the authentication token can also be generated using a secret user key.

Such an embodiment enables the server to verify, during authentication, that the token provided by a client device was indeed generated using the secret user key associated with this client device, thus making the authentication token of a client device unusable by any other device.

The authentication token can be acquired by encryption of the secret user key and of the proof generation key using a second pseudo-homomorphic encryption function.

This token therefore enables proving both the knowledge of the proof generation key, as well as that the client device providing the token for its authentication is indeed that for which the token was generated.

The client device can also have a first encrypted token acquired by encrypting the secret user key using a first pseudo-homomorphic encryption function and further comprising a transmission step for transmitting the first encrypted token by the client device to the server.

During the authentication, this enables the server to verify the consistency of the authentication token with this first additional encrypted token, thus making any fraudulent use of the authentication token more difficult.

The authentication method according to the first aspect can therefore comprise a step for determining a first parameter by the client device and of a second encrypted token acquired by encrypting the secret user key and said first parameter using the first pseudo-homomorphic encryption function and a step for transmitting the second encrypted token by the client device to the server.

The step for generating proof of knowledge of the secret element of the method according to the first aspect can comprise the transmission of a challenge by the server to the client device, and the generation by the client device of a signature data item acquired based on the first parameter, a first hash value and the masked proof generation key, said first hash value being acquired based on the challenge received, the first encrypted token, the authentication token masked using the first mask data item and the second encrypted token, the step for transmitting, to the server by the client device, said proof of knowledge of the secret element of the method according to the first aspect can therefore comprise the transmission, by the client device, of said signature data item to the server.

This is used to link the secret user key k and the first parameter t, corresponding to an element of the proof of knowledge of the secret element, in the second encrypted token. The verification of this proof of knowledge, and therefore the user's authentication, thus requires the client device to provide four elements to the server (the proof of knowledge, the authentication token and the first and second encrypted tokens) that are consistent, i.e. that correspond to the same secret element P, to the same secret key k, to the same first parameter t and to the same masking data item β.

In such an embodiment, the verification steps for verifying, by the server, the validity of the masked authentication token received and the validity of the proof of knowledge can comprise:

the calculation of a second hash value based on the challenge, the first encrypted token, the masked authentication token and the second encrypted token received;

the calculation of a first decrypted token by decryption of the first encrypted token using the first pseudo-homomorphic encryption function;

the calculation of a proof verification key by decryption of the masked authentication token using the second pseudo-homomorphic encryption function;

the calculation of a second decrypted token by decryption of the second encrypted token using the first pseudo-homomorphic encryption function;

the verification of the validity of the masked authentication token received and the proof of knowledge based on the signature data item received, the first decrypted token, the second decrypted token, the second hash value and the proof verification key.

The server therefore simultaneously verifies the validity of the authentication token J and the proof of knowledge Z, these verification operations providing proof that the user device does indeed have the correct secret element and that the elements provided do indeed correspond to the same secret user key.

According to a second aspect, this invention relates to a computer programme product comprising programme code instructions for executing the steps of the method according to the first aspect, when said programme is run on a computer.

According to a third aspect, this invention relates to a system comprising at least one client device and an authentication server of the client device using a secret element known only by the client device, said client device being configured to:

hold an authentication token generated by means of a pseudo-homomorphic function and based on said secret element, generate a proof of knowledge of the secret element based on a proof generation key masked with a first mask data item, said first mask data item being a non-public, random data item known only by the client device and said masked proof generation key being dependent on said secret element, transmit to the server said proof of knowledge of the secret element generated, transmit to the server the authentication token masked using the first mask data item, said server being configured to:

receive said proof of knowledge of the secret element, generated based on a proof generation key masked with a first mask data item, and transmitted by the client device, receive the authentication token masked using the first mask data item, verify the validity of the masked authentication token received, verify the validity of the proof of knowledge by a zero-knowledge proof, proving the knowledge of said secret element by the client device without revealing it.

Such a computer programme product and system have the same advantages as those stipulated for the methods according to the first aspect.

DESCRIPTION OF THE FIGURES

Other characteristics and advantages of the invention can be clearly observed in the following description, which is given as a rough guide and in no way as a limited guide to the invention and which must be read with reference to the appended figures, from which.

DETAILED DESCRIPTION OF AT LEAST ONE EMBODIMENT

One embodiment concerns a method for authenticating a client device to an authentication server using a secret element such as one or multiple passwords, a PIN code, a key, a biometric data item or a key derived from another data item such as a biometric data item, a user identifier or a mobile device identifier. Such a secret element will be generically referred to as PIN in the remainder of this document.

In order to protect the authentication process for authenticating the client device to the authentication server against tampering and against replay attacks, the purpose of this embodiment is to enable the client device to prove its knowledge of a specific secret element without revealing it, without storing it in memory and without the authentication server becoming aware of this specific secret element.

Figure 1:
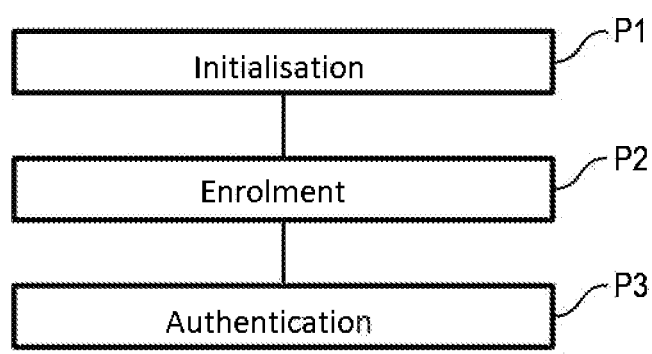
FIG. 1 illustrates a flow chart representing the different phases of an authentication method according to the invention.

For this purpose, as illustrated in FIG. 1, in a preliminary initialisation phase P1, the server generates the elements (keys, integers, vectors, etc.) required to implement the later enrolment and authentication phases.

During the enrolment phase P2, the client enrolls with an enrollment server and acquires an authentication token J generated based on said secret element PIN. The authentication server can be different from or the same as the enrolment server. In the following paragraphs, the two servers are assumed to be the same.

Figure 2:
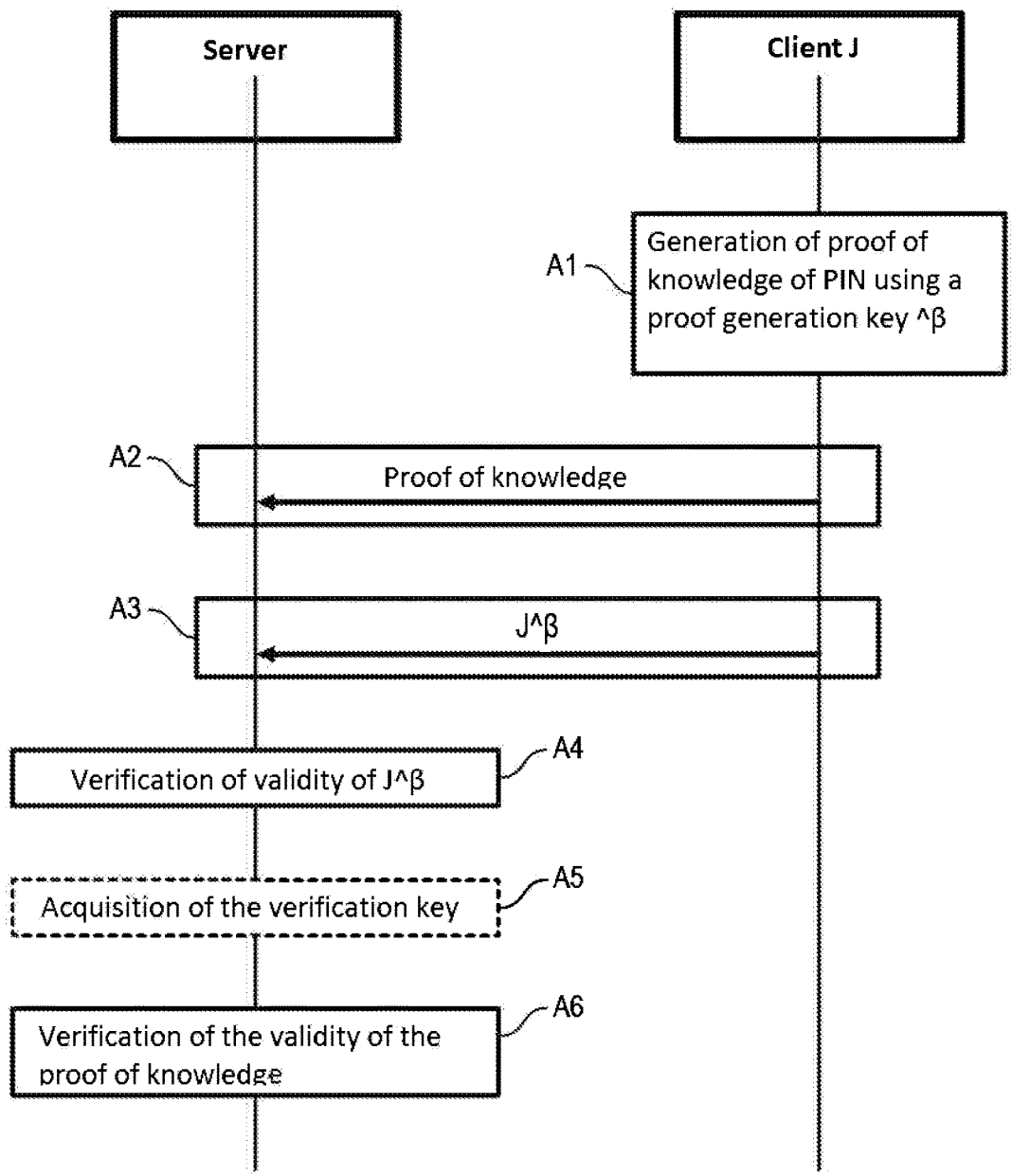
FIG. 2 illustrates a flow chart representing one embodiment of an authentication phase of an authentication method according to the invention.

Subsequently, in an authentication phase P3, the client device is authenticated with the server by proving its knowledge of said secret element PIN without revealing it. To do this, as represented in FIG. 2, said authentication phase P3 comprises a proof of knowledge generation step A1 wherein the client device generates proof of knowledge of the secret element PIN generated using a proof generation key masked with a first mask data item $\beta$, said first mask data item being a non-public, random data item known only by the client device and said masked proof generation key being designed to prove the knowledge of said secret element PIN without revealing it.

Said authentication phase P3 further comprises a first transmission step A2 wherein the client device transmits to the server said proof of knowledge of the secret element generated.

According to an alternative embodiment, the authentication phase can comprise multiple data transmissions between the client device and the server to result in the transmission to the server of the proof of knowledge of the secret element. For the purposes of illustration, the client device can generate a first part of the proof of knowledge, then transmit this to the server. The latter can then send a challenge to the client device, which can then generate a second part of the proof of knowledge based on this challenge, and transmit it to the server.

Said authentication phase P3 further comprises a second transmission step A3 wherein the client device transmits to the server the authentication token J masked using the first mask data item $\beta$.

The first transmission step A2 and the second transmission step A3 can be merged, whereby the proof of knowledge and the authentication token are transmitted at the same time to the server by the client device.

Said authentication phase P3 further comprises a first verification step A4 wherein the server verifies the validity of the masked authentication token received.

Said authentication phase P3 finally comprises a second verification step A6 wherein the server verifies the validity of the proof of knowledge. This verification can take place based on the masked authentication token received.

Said authentication phase P3 can also comprise an acquisition step A5 wherein the server acquires a proof verification key associated with said proof generation key. The verification step A6 for verifying the validity of the proof of knowledge therefore comprises a verification by the server of the validity of the proof of knowledge using the proof verification key.

The authentication token is sent by the client device to the server in a masked manner so that no-one, not even the server, can re-use it during a subsequent authentication process to pose as the client device.

Therefore, thanks to the proof of knowledge, the client device can prove its knowledge of the secret element to which the authentication token corresponds, without revealing this element. The client device can also prove the validity of the authentication token.

The authentication token J can be stored in the internal memory of the client device or in an external memory connected to the client device via a local connection such as a USB connection or a network connection. The authentication token of the user can therefore be partially or fully stored in a network storage location shared by multiple client devices belonging to the same user.

The authentication token J can be generated using a pseudo-homomorphic function in several ways and via different embodiments resulting therefrom, as described hereinbelow.

A pseudo-homomorphic function f is a function that is compatible with masking, such that, for a masking operation M such as multiplication by a mask data item $\alpha$, there is an operation O, such as exponentiation by a, such that $O(f(x))=f(M(x))$, i.e. $(f(x))\hat{}a=f(x*a)$. Such a function can also be homomorphic between two operations Op1 and Op2 if performing the operation Op2 on $(f(x), f(y))$ can be used to obtain $f(x\ Op1\ y)$.

$1^{st}$ Embodiment Wherein the Authentication Token is Generated Based on Pseudo-Homomorphic Encryption and Signature Functions:

According to a first embodiment for generating the authentication token, the authentication token J can comprise an encryption token C acquired by encryption based on said secret element PIN using a pseudo-homomorphic encryption function Enc. It can further comprise a signature token S corresponding to the result of the signature of the encryption token C using a pseudo-homomorphic signature function Sign.

Initialisation Phase

More precisely, during a preliminary initialisation phase, the server can begin by generating the keys required by the encryption and signature functions, the latter capable of being asymmetric functions.

Figure 3:
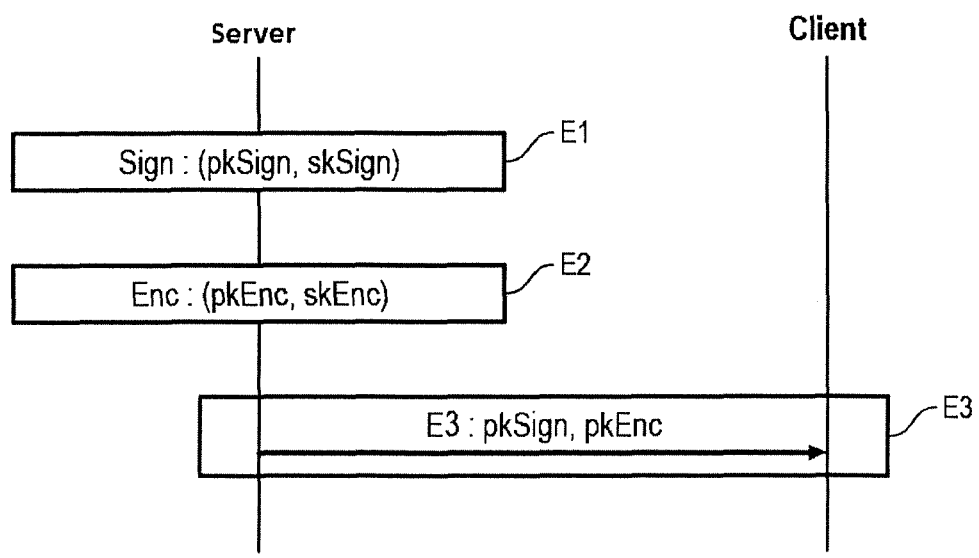
FIG. 3 illustrates a flow chart representing one embodiment of an initialisation phase of an authentication method according to the invention.

With reference to FIG. 3, during a first key generation step E1, the server can generate a pair of asymmetric signature keys (pkSign, skSign) dedicated to the implementation of the pseudo-homomorphic signature algorithm Sign. Such a signature algorithm can be a multiplicatively homomorphic algorithm such as the Gennaro algorithm according to the following reference: Rosario Gennaro, Jonathan Katz, Hugo Krawczyk, Tal Rabin, Secure network coding over the integers, Public Key Cryptography 2010, 142-160.

During a second key generation step E2, the server can generate a pair of asymmetric encryption keys (pkEnc, skEnc) dedicated to the implementation of the pseudo-homomorphic encryption algorithm Enc. Such an algorithm can, for example, be an ElGamal algorithm or a Paillier algorithm according to the following references: Taher El Gamal, A public-key cryptosystem and a signature scheme based on discrete logarithms, IEEE Transactions on Information Theory 31 (4), 469-472, doi:10.1109/TIT.1985.1057074, CRYPTO'84, 10-18 and Pascal Paillier, Public-key cryptosystems based on composite degree residuosity classes, EUROCRYPT 1999, 223-238.

During a key transmission step E3, the server can transmit to the client device the public encryption key of said pair of asymmetric encryption keys pkEnc and the public signature key of said pair of asymmetric signature keys pkSign. Alternatively, when the encryption algorithm is intended to be implemented by the server only, the latter only transmits the public signature key to the client device.

The client device therefore has a signature key that enables it to verify the validity of the signature tokens generated by the server. The client can therefore have an encryption key that enables it to generate an encryption token that can be decrypted by the server.

The server has the corresponding private keys enabling it to respectively generate signature tokens and decrypt encryption tokens.

According to one embodiment, the encryption and/or signature keys can be associated with an identifier identifying the client in possession of the client device. Such an association strengthens the protection of the authentication method against attacks by imposing, for example, that an encryption token used by a client device was generated with the encryption key associated with this client device; conversely, the authentication operations performed by the server will result in a failure and the client device will not be authenticated.

For this purpose, said encryption and/or signature keys can be matched with an identifier identifying the client in possession of the client device in a database that can be stored in the storage means of the server. Alternatively, said encryption and/or signature keys can be derived from a hash value function of the identifier identifying the client in possession of the client device, thus avoiding the need to physically store the exact matching at server level. Such a hash value can be generated by a hash function on integers or on elliptic curves.

Enrolment Phase

The method can then continue via an enrolment phase, enrolling the client device with the enrolment server, wherein the client device acquired the authentication token J.

This phase can comprise a secret element determination step by the client device E4, an encryption token generation step E5 and a signature token generation step E6.

Figure 4:
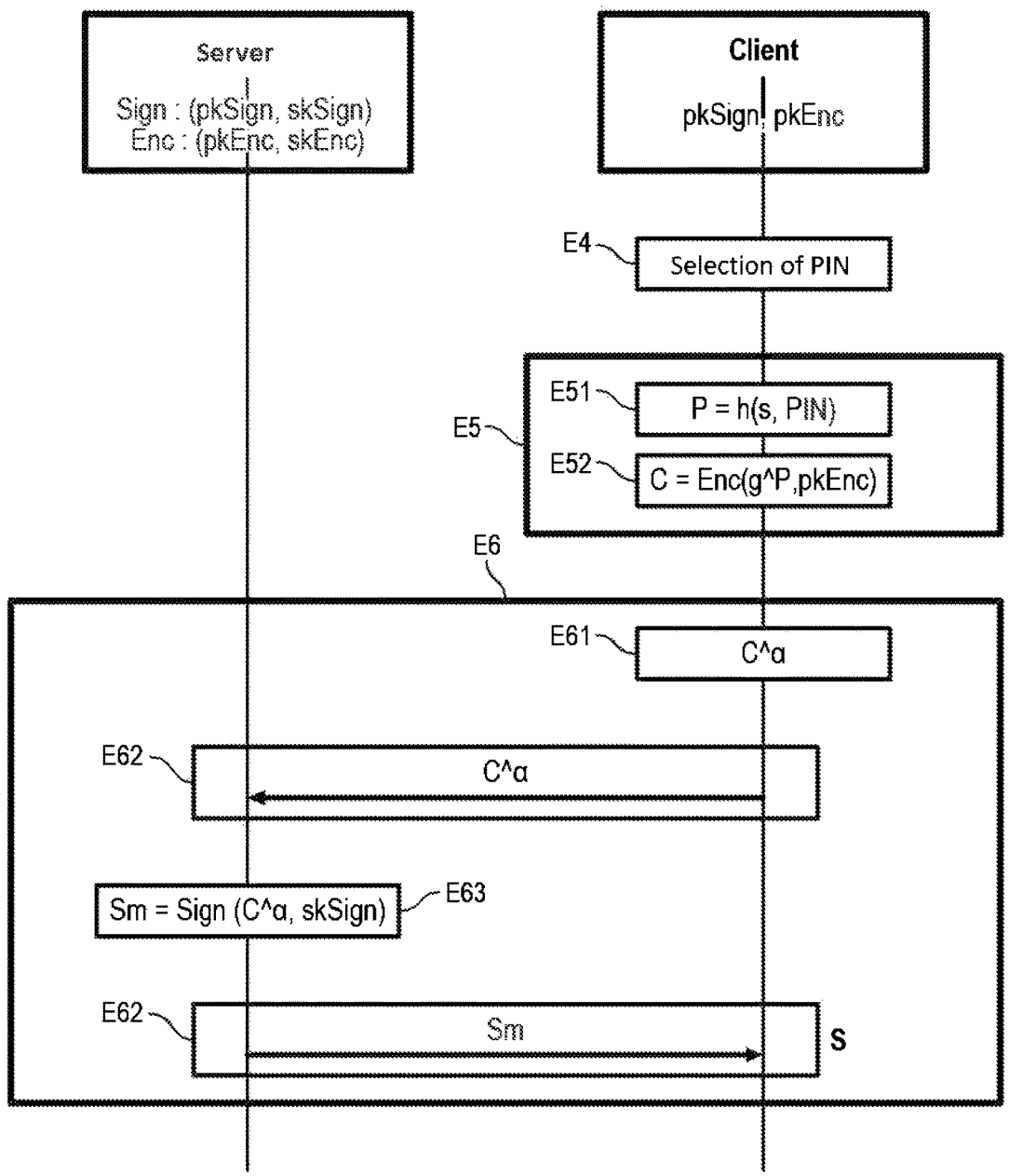
FIG. 4 illustrates a flow chart representing a first embodiment of an enrolment phase of an authentication method according to the invention.

According to a first embodiment represented in FIG. 4, the secret element determination step E4 comprises the selection of the secret element by a client in possession of the client device and the encryption token generation step E5 comprises the generation of the encryption token by the client device.

More precisely, the encryption token generation step E5 can comprise a first hash value calculation step E51 wherein a hash value of the secret element is calculated by the client device based on a hash function. For the purposes of illustration, the client device calculates a hash value P=h(s, PIN), where h is a hash function, s is a random number referred to as sel and PIN is the secret element chosen by the client during the secret element determination step E4.

Alternatively, the first hash value calculation step E51 can comprise the calculation of a hash value of said secret element and of at least one additional secret element based on a hash function. Such an additional secret element can, for example, be an additional key or an element linked to the configuration of the client device such as a character string derived from the hardware configuration of the client device, from an address of a specific data item in memory, etc.

The encryption token generation step E5 can then comprise a first encryption step E52 wherein the client device generates an encryption token by encrypting a data item depending on the secret element PIN chosen using its public encryption key pkEnc dedicated to the implementation of the encryption function Enc. For the purposes of illustration, the client device can generate an encryption token C equal to Enc(g^P, pkEnc), where P is the hash value calculated during the first hash value calculation step E51 and g is a high-order group generator. The client device therefore has an encrypted version of the secret element chosen.

The generator g can be the same for all client devices or be specific to a given client device. In the latter case, the correspondence between the generator g chosen for each client and the identity of each client can be stored in a database on the server or the generator g can be generated by elliptic curve point encoding.

This generation of the encryption token is followed by the generation of a corresponding signature token. In this first embodiment, the signature token generation step E6 can comprise a first masking step E61 wherein the client device masks the encryption token C using a second mask data item α. This second mask data item is a random data item known only by the client device. The masked encryption token can be written as C^α. Given the homomorphism property of the encryption function Enc, this masked encryption token corresponds to the result of the encryption of the secret element masked by the second mask data item α.
This gives: C^α=(Enc(g^P))^α=Enc((g^P)^α)=Enc(g^(P*α))

The signature token generation step E6 can then comprise a first token transmission step E62 wherein the client device transmits the masked encryption token C^α to the server.

The signature token generation step E6 can then comprise a first signature generation step E63 wherein the server generates a second signature data item Sm by signing the received masked encryption token using its private signature key skSign. This gives: Sm=Sign(C^α, skSign).

The signature token generation step E6 can then comprise a second token transmission step E64 wherein the server transmits the second signature data item Sm to the client.

According to a first alternative embodiment, the client device then acquires a signature token S by unmasking the second signature data item Sm with the second mask data item α and stores the unmasked signature token S=Sign(C, skSign) in memory.

According to a second alternative embodiment, the client device stores the second signature data item Sm and the second mask data item α in memory. The client device is therefore able, when required, to unmask the second signature data item Sm to acquire the unmasked signature token S.

Figure 5:
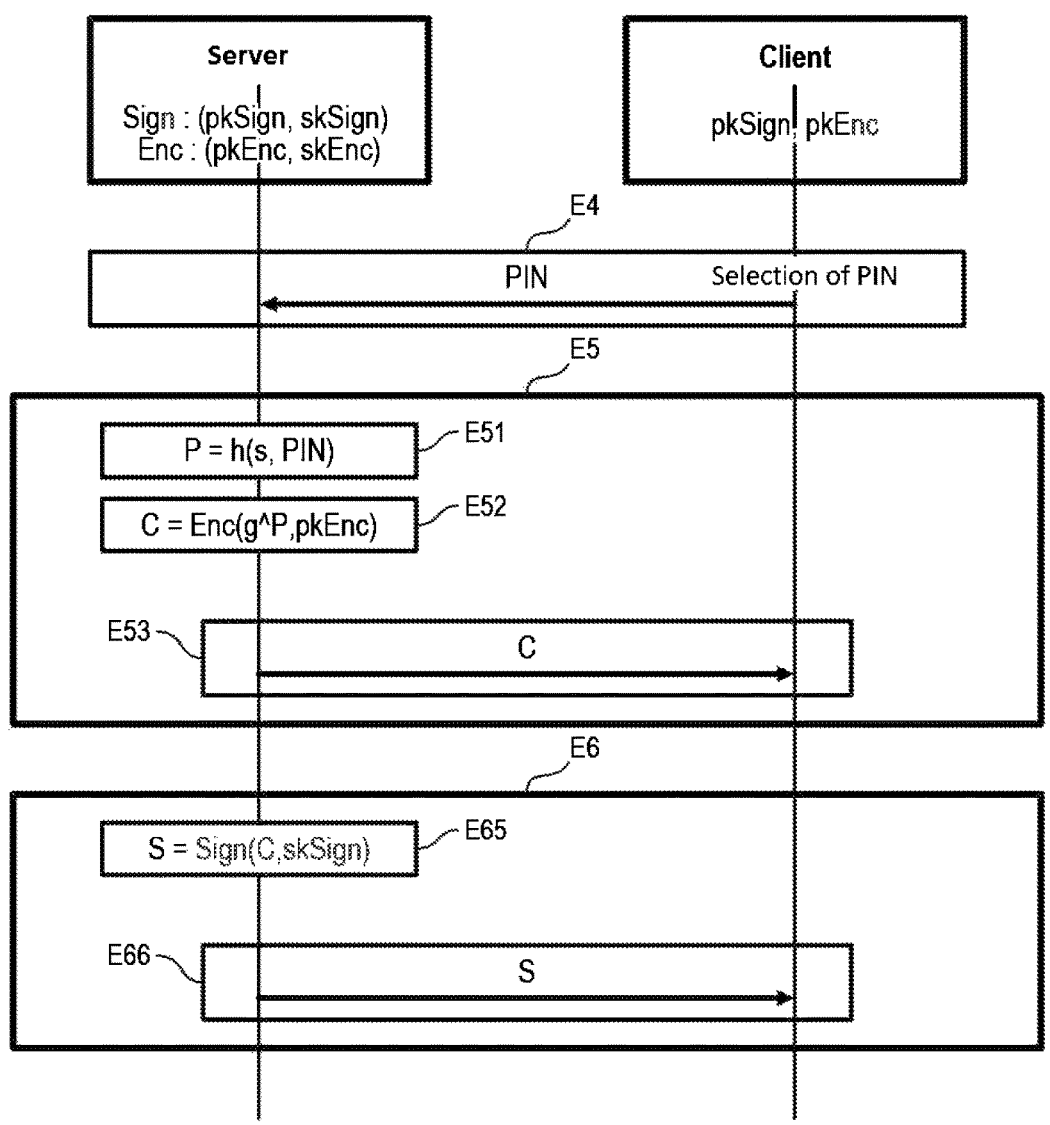
FIG. 5 illustrates a flow chart representing a second embodiment of an enrolment phase of an authentication method according to the invention.

According to a second embodiment represented in FIG. 5, the enrolment of the client device takes place with a trusted enrolment server capable of becoming aware of the secret element chosen by the client. The secret element determination step E4 therefore comprises the selection of the secret element by a client in possession of the client device and the transmission of the selected secret element to the server, in a masked or encrypted form, and the encryption token generation step E5 and signature token generation step E6 comprise the generation of the encryption token and the signature token by the server and the transmission of these tokens to the client device.

More precisely, the encryption token generation step E5 can comprise a first hash value calculation step E51 and a first encryption step E52 similar to those described hereinabove in the first embodiment, however which are implemented by the enrolment server. Alternatively, during the first encryption step E52, the encryption token generated by the enrolment server can depend on a secret key k of the enrolment server. For example, the encryption token can be equal to C=Enc (g^(P*k)). Optionally, such a key can depend on the identity of the client. The encryption token generation step E5 can also comprise a third token transmission step E53 wherein the server transmits the encryption token generated during the first encryption step E52 to the client device. According to an alternative embodiment, the encryption token transmitted can be accompanied by an additional element C2 dependent on the secret key k of the enrolment server. For example, this additional element can be equal to C2=Enc2 (g^k), where Enc2 is an encryption algorithm using an encryption key that is possible different from that used by the algorithm Enc.

The signature token generation step E6 can comprise a second signature generation step E65 wherein the server generates a signature token S by signing the encryption token C generated during the encryption token generation step E5 using its private signature key skSign. This gives: S=Sign(C, skSign). The signature token generation step E6 can then comprise a fourth token transmission step E66 wherein the server transmits the signature token S generated to the client.

Figure 6:
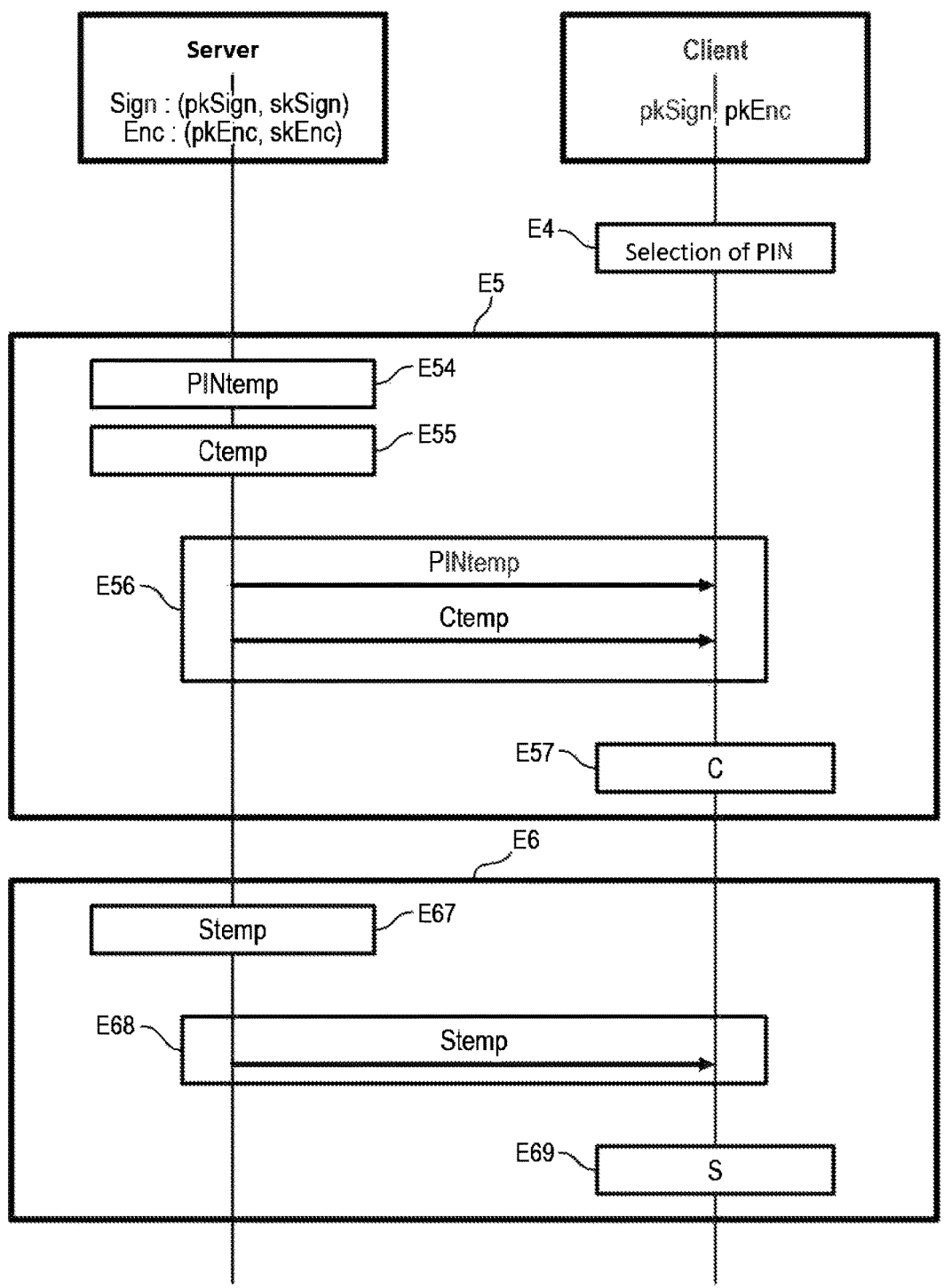
FIG. 6 illustrates a flow chart representing a third embodiment of an enrolment phase of an authentication method according to the invention.

In a third embodiment illustrated in FIG. 6, the encryption token generation step E5 can comprise the generation, by the server, of a temporary secret element, the generation of a temporary encryption token based on the temporary secret element, the transmission of the temporary secret element and the temporary encryption token to the client device and the generation, by the client device, of an encryption token based on the temporary encryption token, the temporary secret element and the secret element (PIN) chosen by the client during the secret element determination step E4. Moreover, the signature token generation step E6 can comprise the generation, by the server, of a temporary signature token by signing the temporary encryption token, the transmission of the temporary signature token to the client device, and the generation, by the client device, of a signature token based on the temporary signature token, the temporary secret element and the secret element (PIN). The client device can therefore generate its encryption and signature tokens itself, corresponding to its secret element PIN based on the temporary tokens transmitted by the server.

More precisely, the encryption token generation step E5 can comprise a temporary secret element generation step E54 wherein the server generates a temporary secret element PINtemp, that is, for example, random. The encryption token generation step E5 can then comprise a first temporary token generation step E55 wherein the server generates a temporary encryption token Ctemp, based on the temporary secret element PINtemp, and potentially an additional secret element as described hereinabove. For this purpose, the server can generate a hash value Ptemp=h(s,PINtemp) based on the temporary secret element PINtemp in a similar manner to the hash value calculation implemented during the first hash value calculation step E51 described hereinabove, then the server can generate the encryption token Ctemp=Enc(g^Ptemp, pkEnc) based on the hash value calculated in a similar manner to the generation of the encryption token implemented during the first encryption step E52 described hereinabove. The encryption token generation step E5 can then comprise a fifth token transmission step E56 wherein the server transmits the temporary secret element PINtemp and the temporary encryption token Ctemp to the client device. The encryption token generation step E5 can then comprise a first token derivation step E57 wherein the client device derives an encryption token C corresponding to its secret element PIN based on the temporary encryption token Ctemp, the temporary secret element PINtemp and the secret element PIN chosen by the client during the secret element determination step E4. Thanks to the homomorphism property of the encryption function Enc, the client device can actually replace the temporary secret element PINtemp by the secret element PIN in the encryption token Ctemp. This, for example, gives: C=Ctemp^(P/Ptemp)=(Enc(g^Ptemp, pkEnc))^(P/Ptemp)=Enc((g^Ptemp)^(P/Ptemp), pkEnc)=Enc(g^P, pkEnc).

The signature token generation step E6 can comprise a second temporary token generation step E67 wherein the server generates a temporary signature token Stemp based on the temporary encryption token Ctemp. For this purpose, the server can sign the temporary encryption token using its private signature key skSign to generate a temporary signature token Stemp=Sign(Ctemp, skSign) in a similar manner to the generation of the signature token implemented during the second signature generation step E65 described hereinabove. The signature token generation step E6 can then comprise a sixth token transmission step E68 wherein the server transmits the temporary signature token Stemp to the client device. The signature token generation step E6 can finally comprise a second token derivation step E69 wherein the client device derives a signature token S corresponding to its secret element PIN based on the temporary signature token Stemp, the temporary secret element PINtemp and the secret element PIN chosen by the client during the secret element determination step E4. Thanks to the homomorphism property of the signature function Sign, the client device can actually replace the temporary secret element PINtemp by the secret element PIN in the signature token Stemp. This gives: S=Stemp^(P/Ptemp)=(Sign(Ctemp, skSign))^(P/Ptemp)=Sign((Ctemp)^(P/Ptemp), skSign)=Sign(C, skSign).

At the end of the enrolment phase, after the implementation of the encryption token generation and signature token generation steps E5 and E6, the client device can have an encryption token C corresponding to the result of the encryption of its secret element PIN using a pseudo-homomorphic encryption function Enc, as well as a signature token S corresponding to the result of the signature by the enrolment server of the encryption token C using a pseudo-homomorphic signature function Sign, or a second signature data item Sm and a second mask data item α enabling it to generate the signature token S.

The client device can verify the validity of the signature token S or of the second signature data item Sm received using the public signature key pkSign transmitted by the server.

Authentication Phase

The method according to the invention can then continue via an authentication phase for authenticating the client device to the authentication server.

Figure 7:
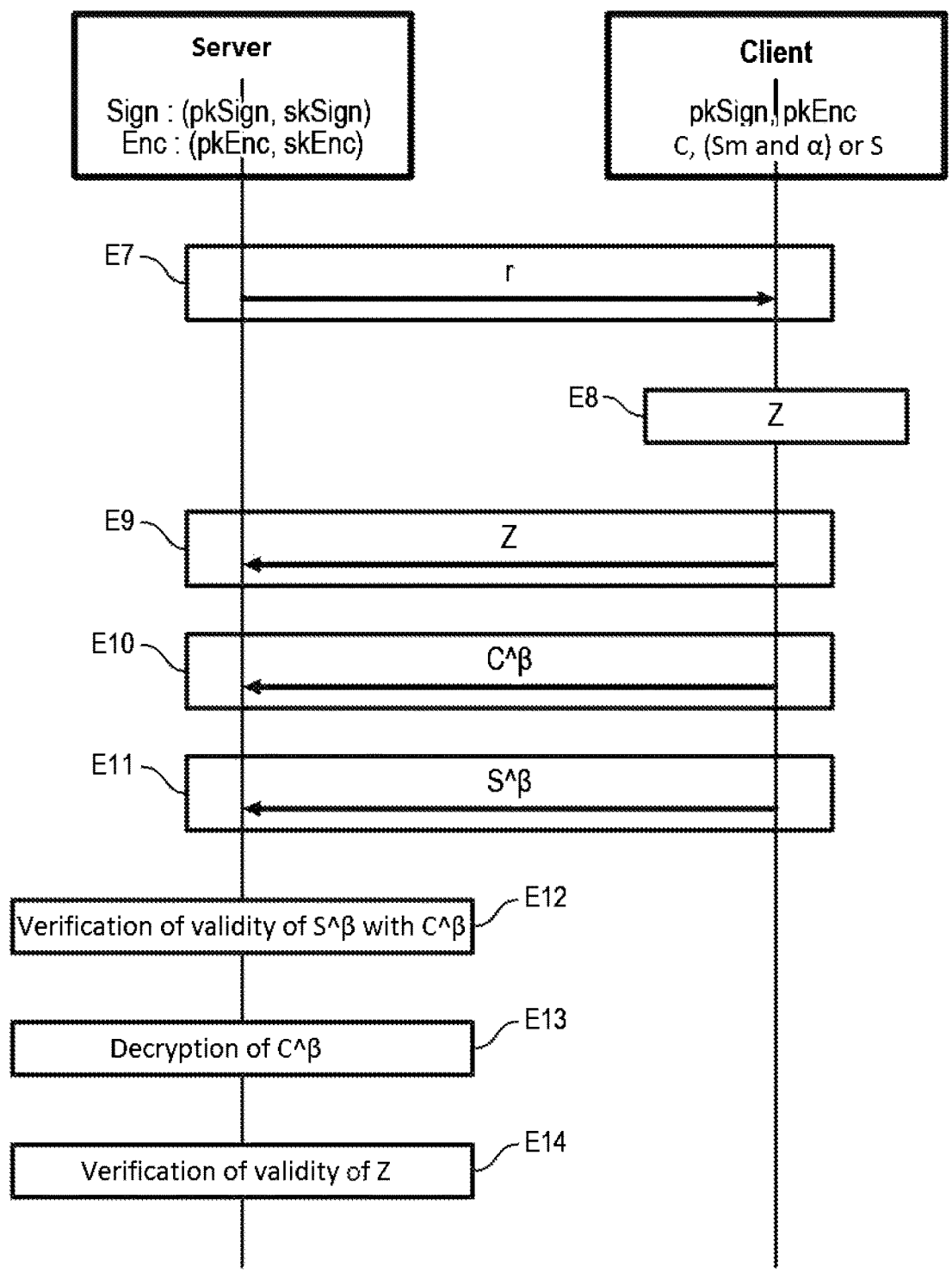
FIG. 7 illustrates a flow chart representing a first embodiment of an authentication phase of an authentication method according to the invention.
Figure 8:
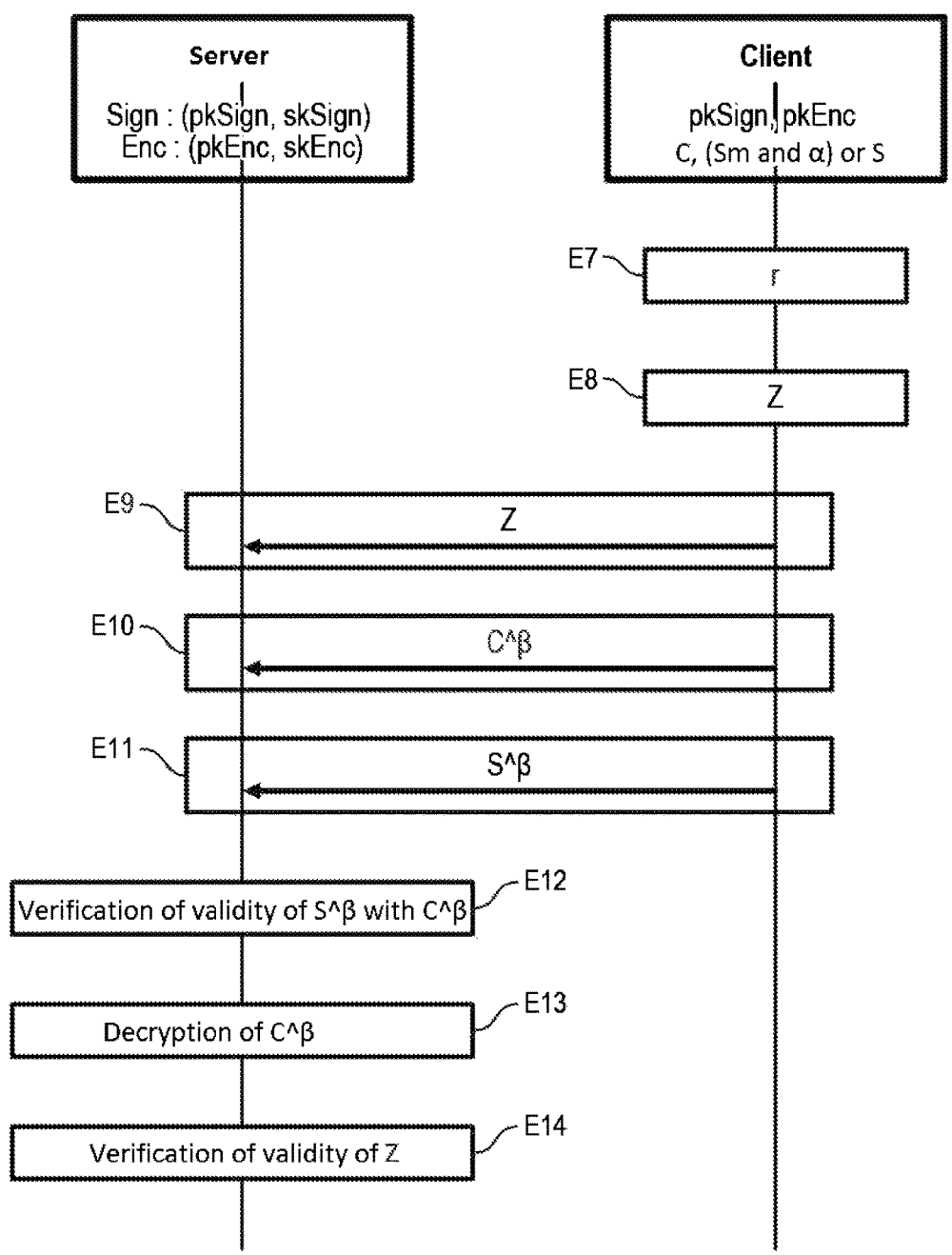
FIG. 8 illustrates a flow chart representing a second embodiment of an authentication phase of an authentication method according to the invention.
Figure 9:
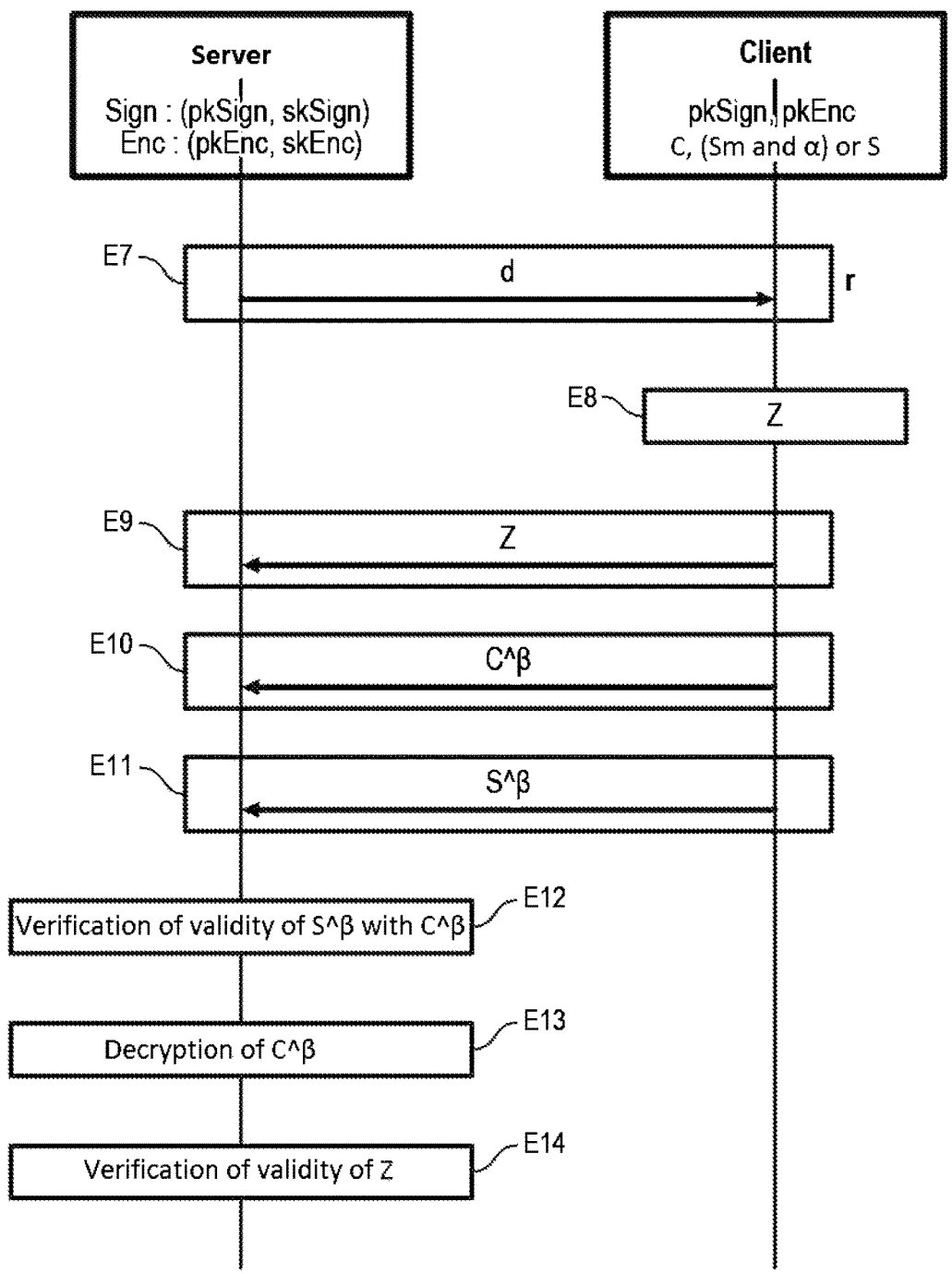
FIG. 9 illustrates a flow chart representing a third embodiment of an authentication phase of an authentication method according to the invention.
Figure 10:
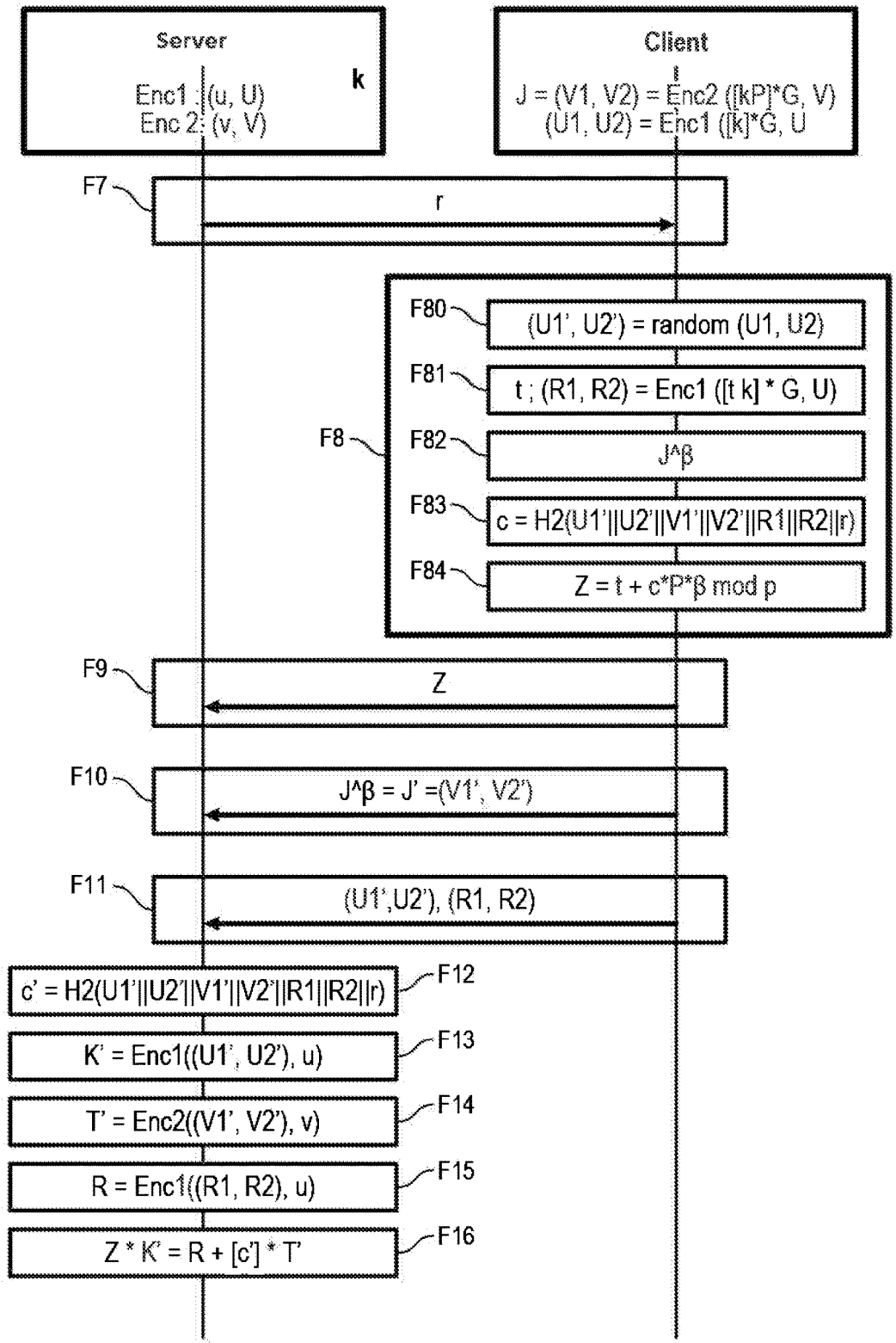
FIG. 10 illustrates a flow chart representing one embodiment wherein the authentication token is generated based on pseudo-homomorphic double encryption on elliptic curves.

According to a first alternative embodiment described in FIG. 7, the proof of knowledge generation step A1 can comprise a challenge transmission step E7 wherein the server transmits a challenge r to the client device. According to a second alternative embodiment described in FIG. 8, the proof of knowledge generation step A1 can comprise a message determination step E7 wherein the client device determines a message r based on the identity of the client and a timestamp. The client device can also determine an authentication counter. According to a third alternative embodiment described in FIG. 9, the proof of knowledge generation step A1 can comprise a challenge transmission and message determination step E7 wherein the server transmits a challenge d to the client device and the latter determines a message r based on the challenge d received, the identity of the client and a timestamp.

The authentication phase can then comprise a third signature generation step E8 wherein the client device generates a signature data item Z by signing the challenge or message r using a proof generation key masked with a random, non-public data item known only by the client device, referred to as first mask data item β, whereby said masked key enables the knowledge of the secret element PIN to be proven without revealing it. For the purposes of illustration, the client device generates the signature data item Z by signing the challenge or message r with a masked proof generation key P*β according to the formula Z=signature(r, P*β). In order to generate this signature data item, the client device must have access to the value of the secret element to generate the masked proof generation key. The client in possession of the client device can, at this time, enter the secret element PIN on the client device. The client device can, after a first entry by the client, temporarily store the value of the secret element or its encrypted value in memory, for example for the duration of an ongoing session. For the purposes of illustration, the signature algorithm used to generate the signature data item Z is a DSA, ECDSA or Schnorr-type signature algorithm.

The first transmission step A2 can then comprise a signature data transmission step E9 wherein the client device transmits the signature data item Z to the server.

The second transmission step A3 can comprise a seventh token transmission step E10 wherein the client device transmits to the server its encryption token C masked using the first mask data item β. For example, the client device transmits the data item C^β. Thanks to the homomorphism property of the encryption function, this masked encryption token corresponds to the result of the encryption by the encryption function Enc of the hash P of the secret element PIN masked using the first mask data item β. For the purposes of illustration: C^β=(Enc(g^P, pkEnc))^β=Enc((g^P)^β, pkEnc)=Enc(g^(P*β), pkEnc).

The second transmission step A3 can further comprise an eighth token transmission step E11 wherein the client device transmits to the server its signature token S masked using the first mask data item β. For example, the client device transmits the data item S^β. Thanks to the homomorphism property of the signature function, this masked signature token corresponds to the result of the signature by the signature function Sign of the encryption token C masked using the first mask data item β. For the purposes of illustration: S^β=(Sign(C, skSign))^β=Sign (C^β, skSign). Alternatively, if the encryption token C transmitted dependents on a secret key of the enrolment server, for example C=Enc(g^(P*k)), the client device transmits the value g^(P*β) during the eighth token transmission step E11.

The first verification step A4 can comprise a third verification step E12 wherein the server verifies the validity of the signature of the masked signature token S^β received based on the masked encryption token C^β received. The server can therefore verify that the client device has an encryption token and the corresponding signature token generated using the private key pkSign of the signature function Sign, known only by the server. Thanks to the masking by the first mask data item β, this verification is performed without revealing the encryption token C and the signature token S of the client device, thus preventing this data from being intercepted and re-used by an attacker. Alternatively, if the encryption token C transmitted is dependent on a secret key of the enrolment server, the server performs, in the third verification step E12, a consistency verification by calculating the value $(g\hat{\ }(P*\beta))\hat{\ }k=g\hat{\ }(P*\beta*k)$ and by verifying that it is equal to the result of the decryption of the masked encryption token $C\hat{\ }\beta$ received.

The second verification step A6 can comprise a fourth verification step E14 wherein the server verifies the validity of the signature of the signature data item received ($Z$=signature($r$, $(P*\beta)$)) using a proof verification key. According to a first alternative embodiment, the proof verification key can be the masked authentication token itself. According to a second alternative embodiment, the proof verification key is associated with the masked proof generation key. The proof verification key can, for example, be the public key corresponding to the private proof generation key $P*\beta$ in a public key/private key signature scheme. The proof verification key can, for example, be equal to $g\hat{\ }(P*\beta)$. Alternatively, the proof verification key can be equal to $g\hat{\ }(P*\beta*k)$ if the token transmitted is dependent on a secret key of the enrolment server.

The acquisition step A5 can therefore comprise an decryption step E13 wherein the server decrypts the masked encryption token $C\hat{\ }\beta=Enc(g\hat{\ }(P*\beta))$, alternatively $C\hat{\ }\beta=Enc(g\hat{\ }(P*\beta*k))$ using the pseudo-homomorphic encryption function Enc so as to obtain the proof verification key $g\hat{\ }(P*\beta)$, alternatively $g\hat{\ }(P*\beta*k)$.

The server can therefore ensure that the client has knowledge of the secret element used to generate the encryption token provided to it in a masked form. This verification can take place without revealing the secret element or the masked key and without the latter being known by the server.

In the event that the encryption and signature keys used to generate the encryption and signature tokens C and S depend on the identity of the user, the server must use the keys corresponding to the identity of the client to implement the signature verification during the third verification step E12 and the decryption during the decryption step E13. For example, this enables the server to verify that the encryption token provided to it corresponds to the client that provided it, i.e. that the encryption token was indeed generated with the key corresponding to this client; conversely, the decryption of this token fails. Similarly, in the event that the generator g is specific to a given client device, the server must use the generator corresponding to the identity of the client to implement the signature verification during the fourth verification step E14. The identity of the client could have been transmitted to the server by the client device either in an automated manner or after the input of an identifier by the client in possession of the client device. Alternatively, the server does not know the identity of the client and attempts to implement the third verification step E12 and the decryption step E13 with its different keys until these operations are successful or until it has used all of the keys at its disposal.

$2^{nd}$ Embodiment Wherein the Authentication Token is Generated Using Homomorphic MACs on Elliptic Curves:

According to a second embodiment for generating the authentication token, the authentication token J can be generated as a single element using a symmetric, pseudo-homomorphic MAC algorithm.

Initialisation Phase

The server can determine a pseudorandom number generator PRG from a set $K_G$ in the set $Zp^2$, and a pseudorandom function PRF from $K_F \times <G>$ in the set $Zp$, where G is a prime-order group p of generator g. The enrolment server can also draw an element $K=(K1, K2)$ belonging to $K_G \times K_F$, binary variable sets. A security parameter $\lambda$, a non-zero integer, can also be defined, such as $|p|=2\hat{\ }\lambda$. For example $\lambda=128$, 256, 512 or more.

Enrolment Phase

The method can then continue via an enrolment phase, enrolling the client device with the enrolment server, wherein the client device acquires the authentication token J.

This phase can comprise a secret element PIN determination step by the client device E4, and an authentication token J generation step.

The secret element determination step E4 comprises the selection of the secret element by a client in possession of the client device.

The authentication token J generation step can comprise a hash value P calculation step identical to the first hash value calculation step E51 described hereinabove.

The authentication token J generation step can then comprise the following steps:
- the calculation of the values $X1=g\hat{\ }(P*\alpha)$ and $X2=g\hat{\ }\alpha$, where $\alpha$ is a second mask data item known only by the client device,
- the transmission of the values X1 and X2 calculated to the enrolment server,
- the drawing by the server of an element R in the group G, potentially dependent on the identity of the client device,
- the calculation by the server of $u=(u_1, u_2)=PRG(K1)$, $b=PRF(K2, R)$,
- the calculation by the server of a masked authentication token $T'=X1\hat{\ }u_1*X2\hat{\ }(u_2+b)$,
- the transmission by the server of the masked authentication token T' and of the element R to the client device,
- the determination by the client device of the authentication token J based on the masked authentication token T' by raising it to the power of $1/\alpha$,
- the storage by the client device of the authentication token J.

Authentication Phase

The method according to the invention can then continue via an authentication phase for authenticating the client device to the authentication server.

The generation step for generating proof of knowledge of the secret element A1 comprises the generation by the client device of a signature data item Z acquired by signing a challenge $r \in \{0,1\}\hat{\ }\lambda$ transmitted by the server using a proof generation key masked with a first mask data item $\beta$. Such a masked proof generation key is, for example, equal to $P*\beta$. In order to generate this signature data item, the client device must have access to the value of the secret element to generate the masked proof generation key. The client in possession of the client device can, at this time, enter the secret element PIN on the client device. The client device can, after a first entry by the client, temporarily store the value of the secret element or its encrypted value in memory, for example for the duration of an ongoing session. The signature used can be a signature acquired by implementing the Schnorr algorithm.

The proof of knowledge generated, i.e. the signature data item Z is then transmitted during the proof transmission step A2 from the client device to the server.

The second transmission step A3 can comprise a transmission step wherein the client device calculates the value $Y2=g\hat{\ }\beta$ and transmits the value Y2 calculated to the server, as well as the masked authentication token $J'=J\hat{\ }\beta$ and a masked control value CT, in the form CT$^\beta$=Enc(g$^\wedge$(P*$\beta$)) or CT$^\beta$=g$^\wedge$(P*$\beta$). The value g$^\wedge$P or the corresponding encryption Enc(g$^\wedge$(P)), required to calculate the masked control value, can be stored by the client device in the enrolment phase, or be determined on the fly from the value of the secret element entered by the client at the beginning of the authentication phase.

The first verification step A4 can comprise a verification step wherein the server verifies the validity of the masked authentication token J' received. For this purpose, the server can acquire g$^\wedge$(P*$\beta$) from the masked control value, if required by its decryption, calculate u=($u_1$, $u_2$)=PRG(K1), calculate B=Y2$^\wedge$(PRF(K2, R)), calculate D=(g$^\wedge$(P*$\beta$))$^\wedge$ $u_1$*Y2$^\wedge u_2$, and verify if B*D is equal to J$^\beta$.

The verification key acquisition step A5 can comprise the acquisition of a verification key associated with the proof generation key. The verification key can, for example, be the public key corresponding to the private key P*$\beta$ in a public key/private key signature example. For example, in the event that the Schnorr algorithm is used for the signature, the proof verification key can be equal to g$^\wedge$(P*$\beta$).

Finally, the second verification step A6 can comprise a verification step wherein the server verifies the validity of the signature of the signature data item received (Z=signature(r, (P*$\beta$)) using the proof verification key acquired.

3$^{rd}$ Embodiment Wherein the Authentication Token is Generated Using a Diffie Hellman-Type Algorithm on Elliptic Curves (First Alternative Embodiment):

Initialisation Phase

In this phase, the enrolment server defines a security parameter $\lambda$, a non-zero integer. It also determines an elliptic curve (p, G, g), where p is a prime number, order of the group G of the points of the curve, such that |p|=2$^\wedge\lambda$, and where g is a generator of the group G.

Enrolment Phase

This phase can comprise a secret element determination step by the client device E4, and an authentication token J generation step.

The secret element determination step E4 comprises the selection of the secret element by a client in possession of the client device.

The authentication token J generation step can comprise a hash value P calculation step identical to the first hash value calculation step E51 described hereinabove.

The authentication token J generation step can then comprise the following steps:
  the calculation by the client device of a value Y=g$^\wedge$(P*$\alpha$), where $\alpha$ is a mask data item known only by the client device;
  the transmission of said value Y to the server;
  the derivation of a user key k$\in$Zp* by the server;
  the calculation by the server of a masked authentication token T'=Y$^\wedge$k;
  the transmission of the masked authentication token T' to the client device;
  the determination by the client device of the authentication token J based on the masked authentication token T' received by raising it to the power of $\alpha$$^\wedge$(-1) mod p.
  the storage by the client device of an authentication token J.

Authentication Phase

The generation step for generating proof of knowledge of the secret element A1 comprises the generation by the client device of a signature data item Z acquired by signing a challenge r$\in$\{0,1\}$^\wedge\lambda$ transmitted by the server using a proof generation key masked with a first mask data item $\beta$. Such a masked proof generation key is, for example, equal to P*$\beta$. In order to generate this signature data item, the client device must have access to the value of the secret element to generate the masked proof generation key. The client in possession of the client device can, at this time, enter the secret element PIN on the client device. The client device can, after a first entry by the client, temporarily store the value of the secret element or its encryption in memory, for example for the duration of an ongoing session. The signature used can be a signature acquired by implementing the Schnorr or ECDSA algorithm, whereby the secret keys must be in Zp*.

The proof of knowledge generated, i.e. the signature data item Z is then transmitted during the proof transmission step A2 from the client device to the server.

The second transmission step A3 can comprise a transmission step wherein the client device calculates and transmits to the server the masked authentication token J'=J$^\beta$ and a masked control value CT, in the form CT$^\beta$=Enc(g$^\wedge$(P*$\beta$)) or CT$^\beta$=g$^\wedge$(P*$\beta$). The value g$^\wedge$P or the corresponding encryption Enc(g$^\wedge$(P)), required to calculate the masked control value, can be stored by the client device in the enrolment phase, or be determined on the fly from the value of the secret element entered by the client at the beginning of the authentication phase.

The first verification step A4 can comprise a verification step wherein the server verifies the validity of the masked authentication token J' received. For this purpose, the server can acquire g$^\wedge$(P*$\beta$) from the masked control value, if required by its decryption, acquire the derived user key k and verify if (g$^\wedge$(P*$\beta$))$^\wedge$k is equal to J$^\beta$.

The verification key acquisition step A5 can comprise the acquisition of a verification key associated with the proof generation key. The verification key can, for example, be the public key corresponding to the private key P*$\beta$ in a public key/private key signature example. For example, the proof verification key can be calculated from g$^\wedge$(k*P*$\beta$), i.e. from the masked authentication token itself.

The second verification step A6 can comprise a verification step wherein the server verifies the validity of the signature of the signature data item received (Z=signature(r, (P*$\beta$)) using the proof verification key acquired.

3$^{rd}$ Embodiment Wherein the Authentication Token is Generated Using a Diffie Hellman-Type Algorithm on Elliptic Curves (Second Alternative Embodiment):

Initialisation Phase

In this phase, the enrolment server defines a security parameter $\lambda$, a non-zero integer. It also determines an elliptic curve (p, G, g), where p is a prime number, order of the group G of the points of the curve, such that |p|=2$^\wedge\lambda$, and where g is a generator of the group G.

Enrolment Phase

This phase can comprise a secret element determination step by the client device E4, and an authentication token J generation step.

The secret element determination step E4 comprises the selection of the secret element by a client in possession of the client device.

The authentication token J generation step can comprise a hash value P calculation step identical to the first hash value calculation step E51 described hereinabove.

The authentication token J generation step can then comprise the following steps:
  the calculation by the client device of a value Y equal to g$^\wedge$(P*$\alpha$), where $\alpha$ is a mask data item known only by the client device;
  the transmission of said value Y to the enrolment server;

the derivation of a user key k∈Zp* by the server and the storage of this key by the server in the form K=g^k;

the calculation by the server of a masked server token T'=Y^k;

the transmission of the masked server token T' to the client device;

the determination by the client device of the authentication token J based on the masked server token T' received by raising it to the power of α^(−1) mod p.

the storage by the client device of an authentication token J.

Authentication Phase

The generation step for generating proof of knowledge of the secret element A1 comprises the generation by the client device of a signature data item Z acquired by signing a challenge r∈{0,1}^λ transmitted by the server with a proof generation key masked with a first mask data item β. Such a masked proof generation key is, for example, equal to P*β. In order to generate this signature data item, the client device must have access to the value of the secret element to generate the masked proof generation key. The client in possession of the client device can, at this time, enter the secret element PIN on the client device. The signature used can be a signature acquired by implementing the Schnorr or ECDSA algorithm, whereby the secret keys must be in Zp*.

The proof of knowledge generated, i.e. the signature data item Z is then transmitted during the proof transmission step A2 from the client device to the server.

The server can furthermore recover the value K=g^k stored during the enrolment phase, draw b in Zp*, calculate K'=K^b and transmit K' to the client device.

The second transmission step A3 can comprise a transmission step wherein the client device calculates and transmits to the server a value K''=K'^(P*β) and the masked authentication token J'=J^β.

The first verification step A4 can comprise a verification step wherein the server verifies the validity of the masked authentication token J' received. For this purpose, the server can verify if (J^β)^b=g^(P*k*β*b) is equal to K''.

The verification key acquisition step A5 can comprise the acquisition of a verification key associated with the proof generation key. The verification key can, for example, be the public key corresponding to the private key P*β in a public key/private key signature example. For example, the proof verification key can be calculated from g^(P*β*k), i.e. from the masked authentication token itself.

The second verification step A6 can comprise a verification step wherein the server verifies the validity of the signature of the signature data item received (Z=signature(r, (P*β)) using the proof verification key acquired.

4th Embodiment Wherein the Authentication Token is Generated Based on the RSA Signature:

Initialisation Phase

The enrolment server defines a security parameter λ, a non-zero integer, defining the size of the cryptographic objects to be used.

It then selects (N, e, d) according to λ, where N being the result of the multiplication of two prime integers and d, the inverse of e modulo N, then a string of bits r containing information specific to the user and calculates R equal to HQ(r), where HQ is an application from {0, 1}* in a group G of generator g. For the purposes of illustration, if λ=100, N is chosen with a size of 2048 bits.

The server then transmits N, e and R to the client device.

Enrolment Phase

This phase comprises a secret element determination step by the client device E4, and an authentication token J generation step.

The secret element determination step E4 can comprise the selection of the secret element by a client in possession of the client device.

The authentication token J generation step can comprise a hash value P calculation step identical to the first hash value calculation step E51 described hereinabove.

The authentication token J generation step can then comprise the following steps:

the calculation and transmission by the client device to the enrolment server of a value H' equal to g^(P*α), where α is a mask data item known only by the client device and of a value R' equal to R masked with the mask data item α: R'=R^α;

the calculation and transmission by the server to the client device of a masked server token S' equal to (R'·H')^d mod N.

the determination by the client device of a server token S based on the masked server token S' received by raising it to the power of 1/α.

the storage by the client device of an authentication token J=(R, S), as well as the values N and e.

Authentication Phase

The generation step for generating proof of knowledge of the secret element A1 comprises the generation by the client device of a signature data item Z acquired by signing a challenge r∈{0,1}^λ transmitted by the server with a proof generation key masked with a first mask data item β. Such a masked proof generation key is, for example, equal to P*β. In order to generate this signature data item, the client device must have access to the value of the secret element to generate the masked proof generation key. The client in possession of the client device can, at this time, enter the secret element PIN on the client device. The signature used can be a signature acquired by implementing any signature algorithm compatible with G.

The proof of knowledge generated, i.e. the signature data item Z is then transmitted during the proof transmission step A2 from the client device to the server.

The second transmission step A3 can comprise a transmission step wherein the client device transmits to the server the masked authentication token J'=J^β=((R^β, S^β) and a value H^β=(H^(α^(−1)))^β.

The first verification step A4 can comprise a verification step wherein the server verifies the validity of the masked authentication token J' received. For this purpose, the server can verify if (S^β)^e=(R^(β*d*e))*g^(P*β*d*e) is equal to R^β·H^β mod N.

The verification key acquisition step A5 can comprise the acquisition of a verification key associated with the proof generation key. The verification key can, for example, be the public key corresponding to the private key P*β in a public key/private key signature example. For example, the proof verification key can be calculated from H^β=g^(P*β).

The second verification step A6 can comprise a verification step wherein the server verifies the validity of the signature of the signature data item received (Z=signature(r, (P*β)) using the proof verification key acquired based on the masked authentication token received.

5th Embodiment Wherein the Authentication Token is Generated Based on Pseudo-Homomorphic Double Encryption on Elliptic Curves:

Initialisation Phase

The enrolment server defines a security parameter $\lambda$, a non-zero integer. It also determines an elliptic curve (p, <G>, G) where p is a prime number such as $|p|=2^\lambda$. p is the order of the group <G> of the points of the curve of generator G. The server also determines a quadruplet of keys (u, v, U, V) belonging to $Zp \times Zp \times <G> \times <G>$ such that U=[u]*G and V=[v]*G, where [u] and [v] are integers modulo p in Zp. U corresponds to a first public key associated with a first private secret key [u] of a first asymmetric pseudo-homomorphic encryption function Enc1 such as the ElGamal algorithm. V corresponds to a second public key associated with a second secret private key [v] of a second asymmetric pseudo-homomorphic encryption function Enc2 such as the ElGamal algorithm. The secret keys [u] and [v] can be different or identical to each other. The first and second functions can be different or identical to each other. These encryption keys will be used to generate the different tokens that will be required by the client device to authenticate itself during a subsequent authentication phase.

Enrolment Phase

This phase can comprise a secret element determination step by the client device E4, and an authentication token J generation step.

The secret element determination step E4 comprises the selection of the secret element by a client in possession of the client device.

The authentication token J generation step can comprise a hash value P calculation step identical to the first hash value calculation step E51 described hereinabove.

The authentication token J generation step can then comprise the following steps:
  the calculation by the client device of a value Y equal to $[P*\alpha]*G$, where $\alpha$ is a mask data item known only by the client device;
  the transmission of said value Y to the enrolment server;
  the derivation of a secret user key $k \in Zp^*$ by the server;
  the calculation by the server of a first encrypted token (U1, U2), resulting from an encryption by the first asymmetric pseudo-homomorphic encryption function Enc1 of the secret user key k with the first public key U associated with the first private secret key u. For example, U1=$[r_1]$*U, U2=[k]*G+$[r_1]$*G, where $r_1$ is determined by the server and belongs to Zp;
  the calculation of a masked server token (V1", V2") resulting from an encryption by the second asymmetric pseudo-homomorphic encryption function Enc2, with the second public key V associated with the second private secret key v, of the secret user key k and of the proof generation key P masked by the mask data item $\alpha$. The masked server token can therefore correspond to the result of the encryption by Enc2 of the product $[kP\alpha]$ *G with the second public key V. For example, V1"=$[r_2']$*V and V2"=[k]*Y+$[r_2']$*G, where $r_2'$ is determined by the server and belongs to Zp;
  the transmission of the first encrypted token (U1, U2) and of the masked server token (V1", V2") to the client device;
  optionally, the storage by the server of H1(K), where H1 is a hash function chosen by the server and where K is equal to [k]*G;
  the determination by the client of the authentication token (V1, V2) based on the masked server token (V1", V2") received by multiplying it by a factor of $\alpha^{\wedge}(-1)$ mod p;
  the storage by the client device of the first encrypted token (U1, U2), as well as of the authentication token J.

At the end of this enrolment phase, the client device can therefore have a first encrypted token and an authentication token, respectively corresponding to the encrypted values of k and kP. These tokens encrypted with the public keys U and V can only be decrypted by the server, the sole equipment in possession of the associated private keys u and v. During a subsequent authentication phase, the client device can therefore use these tokens to prove to the server its knowledge of the secret element PIN without revealing it and to prove that the two tokens have been generated from the same user key k.

Authentication Phase

The generation step for generating proof of knowledge of the secret element A1 comprises the transmission of a challenge $r \in \{0,1\}^{\wedge}\lambda$ by the server to the client device, and the generation by the client device of a signature data item Z acquired, for example according to a Schnorr signature algorithm, based on a first parameter t, of first hash value c and a proof generation key masked with a first mask data item $\beta$. Such a masked proof generation key is, for example, equal to $P*\beta$. In order to generate this signature data item, the client device must have access to the value of the secret element to generate the masked proof generation key. The client in possession of the client device can, at this time, enter the secret element PIN on the client device. Said first hash value c is acquired based on the challenge r received, the first encrypted token (U1, U2), the authentication token J' masked using the first mask data item and a second encrypted token (R1, R2).

The signature data item Z can, for example, be determined at a step F8 by the client device by implementing the following steps:
  optionally, the determination F80 of a first random encrypted token (U1', U2') by applying a random variable to the first encrypted token (U1, U2). For example U1'=U1+[rr]*U and U2'=U2+[rr]*G, where [rr] is a scalar chosen at random, belonging to Zp*; The application of such a random variable to the result of a probabilistic encryption prevents an attacker from being able to trace an initial data item subject to the encryption and the application of the random variable, as the results of the encryption and the application of the random variable will be different for the same initial data item. If this step is not performed, the first encrypted token (U1, U2) is equal to the first random encrypted token (U1', U2') in the remainder of the description.
  the calculation F81 of the second encrypted token (R1, R2) corresponding to the encryption by the first asymmetric pseudo-homomorphic encryption function Enc1 of the secret user key k and a first parameter t drawn in Zp* by the client device with the first public key U associated with the first private secret key u. The second encrypted token can correspond to the encryption of [t k]*G. The second encrypted token is calculated from the first random encrypted token (U1', U2') and the first parameter t. For example: R1=[t]*U1' and R2=[t]*U2',
  the calculation F82 of the masked authentication token obtained by masking the authentication token (V1, V2) using the first mask data item $\beta$: J'=(V1', V2') where V1'=$[\beta]$*V1 and V2'=$[\beta]$*V2
  the calculation F83 of a first hash value c based on the challenge r, the first random encrypted token (U1', U2'), the masked authentication token J' and the second encrypted token (R1, R2). For example, such a first hash value c can be equal to H2(U1'∥U2'∥V1'∥V2'∥R1∥R2∥r), where H2 is a hash function from $\{0,1\}^*$ in $\{0,1\}^{\wedge}\lambda$, and where the sign "∥" represents the concatenation operation, the calculation F84 of the signature data item Z from the first parameter t, the first has value c and the proof generation key masked using the first mask data item β: P*β. For example Z can be equal to t+c*P*β mod p.

The proof of knowledge generated, i.e. the signature data item Z is then transmitted F9 during the proof transmission step A2 from the client device to the server.

The second transmission step A3 can comprise a transmission step F10 wherein the client device transmits to the server the authentication token masked using the first mask data item β: J'=(V1', V2'), The client device also transmits during a step F11 to the server, the first random encrypted token (U1', U2'), as well as the second encrypted token (R1, R2).

The server then simultaneously implements a verification A4 of the validity of the masked authentication token J' received and a verification A6 of the validity of the proof of knowledge Z based on the masked authentication token received. For this purpose, the server can implement the following steps:

the calculation F12 of a second hash value c' based on the challenge r, the first random encrypted token (U1', U2'), the authentication token J' masked using the first mask data item β, J' and the second encrypted token (R1, R2) received. For example, such a first hash value c can be equal to H2(U1'∥U2'∥V1'∥V2'∥R1∥R2∥r).

the calculation F13 of a first decrypted token K' by decrypting the first random encrypted token (U1', U2') with the first private secret key u of the first asymmetric pseudo-homomorphic encryption function. For example, such a first decrypted token K' can be equal to U2'−[u*]*U1', where $u^*=u^{-1}$ mod p; The first decrypted token K' can therefore depend on [k]*G, the calculation F14 of a proof verification key T' by decrypting the masked authentication token (V1', V2') with the second private secret key v of the second asymmetric pseudo-homomorphic encryption function Enc2; For example, the second decrypted token T' can be equal to V2'−[v*]*V1', where $v^*=v^{-1}$ mod p; The second decrypted token T' can therefore depend on [k β P]*G, the calculation F15 of a second decrypted token R by decrypting the second encrypted token (R1, R2) with the first private secret key u of the first asymmetric pseudo-homomorphic encryption function Enc1; For example, the third decrypted token R can be equal to R2 [u*]*R1; The third decrypted token R can therefore depend on [t k]*G, the verification F16 by the server of the validity of the masked authentication token received and the proof of knowledge based on the signature data item Z received, the first decrypted token K', the second decrypted token R, the second hash value c' and the proof verification key T', for example by verifying the following equality: Z*K'=R+[c']*T'. This verification enables the server to determine the validity of the authentication token masked using the first mask data item β received J' and the validity of the proof of knowledge Z. The client device has thus proven to the server its knowledge of the secret element PIN without revealing it. Furthermore, by verifying this equality, the server ensures that the tokens have indeed been generated from the same user key k.

The server can also perform an additional verification by testing if H(K') is equal to H(K). Such an additional verification is used to check that the secret user key k used to generate the tokens provided by the client device during its authentication is the same as that stored in memory by the server for this client during his/her enrolment.

Once the authentication for the client device is successful, session keys such as encryption keys and MAC integrity keys can be generated and shared between the client device and the server, then used as valid keys to secure the exchanges between the client device and the server, for example until expiry of an ongoing session. For the purposes of illustration, these keys can be derived from the verification key gˆ(P*β), used as a secret, shared between the client device and the server.

A recovery mechanism can be provided for the hash value P of the secret element PIN to retrieve this hash value in the event that the client in possession of the client device has forgotten the PIN. Given that the secret element is not known to the server, the latter cannot send it back to the client. One solution consists in that the client device stores a value γ, known as a secret element complement, such that the value γ+P can be easily attacked, for example by a brute force dictionary attack, i.e. that the server can retrieve γ+P from gˆ(γ+P). When the client device wants to retrieve the hash of its secret element, it suffices to generate (gˆP)*(gˆγ) =gˆ(γ+P), and to transmit it to the server. The latter therefore retrieves the value γ+P and re-transmits this to the client device so that it can recover the value P, as it already knows the value γ.

A mechanism can also be provided for modifying the secret element by the client device. New signature and encryption tokens can thus be generated based on a new secret element chosen by the client according to the third generation mode described hereinabove, using temporary tokens generated by the server.

Therefore, the client in possession of the client device can prove to the server its knowledge of the secret element PIN, without storing this secret element in the memory of the client device or the server, thus making the method insensitive to tampering of the memory of the client device or server. Moreover, the data exchanged between the client device and the server can be masked by masking data, making their re-use by an attacker difficult and thus protecting the method against replay attacks. Finally, no complex calculation is required, thus limiting the computing power required and enabling this method to be implemented on a thin client such as a mobile phone.

The invention claimed is:

1. Method for authenticating a client device to a server using a secret element, wherein the secret element is a data item which is not stored in memory, said client device having an authentication token generated by means of a pseudo-homomorphic function and based on said secret element, said authentication token being stored in a memory which is accessible by the client device, but not by the server device, said method comprising the following steps:

generation, by the client device, of a proof of knowledge of the secret element based on a proof generation key masked with a first mask data item, said first mask data item being a non-public, random data item known only by the client device and said masked proof generation key being dependent on said secret element, the client device having access to the secret element when generating the masked proof generation key, transmission to the server by the client device, of said generated proof of knowledge of the secret element, transmission to the server by the client device, of the authentication token masked using the first mask data item, verification by the server of validity of the masked authentication token received, verification by the server of validity of the proof of knowledge by a zero-knowledge proof, proving that the proof of knowledge and the authentication token were generated on the basis of the same secret element, and proving that the client device had access to the secret element when the proof of knowledge was generated, without revealing said secret element to the server device.

2. Authentication method according to claim 1, comprising an acquisition step by the server for acquiring a proof verification key associated with said proof generation key, and wherein the verification step for verifying the validity of the proof of knowledge comprises a verification by the server of the validity of the proof of knowledge using the proof verification key acquired.

3. Authentication method according to claim 1 or claim 2, wherein the server verifies the validity of the proof of knowledge based on the masked authentication token received.

4. Authentication method according to claim 1, wherein the authentication token comprises an encryption token acquired by encryption based on said secret element using a pseudo-homomorphic encryption function.

5. Authentication method according to claim 4, wherein:
the authentication token further comprises a signature token corresponding to the result of the signature of the encryption token using a pseudo-homomorphic signature function;
the transmission step for transmitting the masked authentication token comprises the transmission, by the client device to the server, of the encryption token held, masked using the first mask data item, and the transmission, by the client device to the server, of the signature token held, masked using the first mask data item;
the verification step for verifying the masked authentication token comprises the verification by the server, of the validity of the signature of the masked signature token received based on the masked encryption token received.

6. Authentication method according to claim 1, wherein:
the generation step for generating proof of knowledge of the secret element comprises the transmission of a challenge by the server to the client device, and the generation, by the client device, of a signature data item acquired by signing the received challenge using said masked proof generation key,
the transmission step for transmitting, to the server by the client device, said proof of knowledge of the secret element comprises the transmission, by the client device, of said signature data item to the server.

7. Authentication method according to claim 4, wherein:
the transmission step for transmitting the masked authentication token comprises the transmission, by the client device to the server, of the encryption token held, masked using the first mask data item, the acquisition step for acquiring the proof verification key based on the masked authentication token received comprises the decryption, by the server, of the received masked encryption token using the pseudo-homomorphic encryption function so as to acquire a proof verification key, the verification step for verifying the validity of the proof of knowledge comprises the verification, by the server, of the validity of the received signature of the signature data item using the proof verification key acquired.

8. Authentication method according claim 5, further comprising the following steps during a prior enrolment phase:
the determination of the secret element by the client device, and
the generation of the encryption and signature tokens.

9. Authentication method according to claim 8 wherein, during the enrolment phase, the secret element determination step comprises the selection of the secret element by a client in possession of the client device and the encryption token generation step comprises the generation of the encryption token by the client device.

10. Authentication method according to claim 8 wherein, during the enrolment phase, the secret element determination step comprises the selection of the secret element by a client in possession of the client device and the transmission of the selected secret element to the server, and the encryption and signature token generation steps comprise the generation of the encryption token and the signature token by the server and the transmission of these tokens to the client device.

11. Authentication method according to one of claim 8, wherein the encryption token generation step comprises the calculation of a hash value of the secret element based on a hash function and the encryption of said hash using the pseudo-homomorphic encryption function.

12. Authentication method according to claim 8, wherein the encryption token generation step comprises the generation, by the server, of a temporary secret element, the generation of a temporary encryption token based on the temporary secret element, the transmission of the temporary secret element and the temporary encryption token to the client device and the generation, by the client device, of an encryption token based on the temporary encryption token, the temporary secret element and the secret element, and wherein the signature token generation step comprises the generation, by the server, of a temporary signature token by signing the temporary encryption token, the transmission of the temporary signature token to the client device, and the generation, by the client device, of a signature token based on the temporary signature token, the temporary secret element and the secret element.

13. Authentication method according to claim 12, wherein the generation of the temporary encryption token comprises the calculation of a hash value of the temporary secret element based on a hash function and the encryption of said hash value using the pseudo-homomorphic encryption function.

14. Authentication method according to claim 11, wherein the calculation step for calculating a hash value of the secret element comprises the calculation of a hash of said secret element and of at least one additional secret element based on a hash function.

15. Authentication method according to claim 11, wherein the generation of an encryption token based on the secret element σ takes place using the following formula: where g is a high-order group generator and wherein s is a random number, h is a hash function, and wherein σ is equal to the secret element, or σ is equal to a temporary secret element.

16. Authentication method according to one of claim 8 wherein, during the enrolment phase:
the encryption token generation step performed by the client device,
and the signature token generation step comprises:
the masking of said encryption token using a second, random mask data item α known only by the client device,
the transmission of said masked encryption token to the server,
the generation, by the server, of a second signature data item by signing the received masked encryption token using the pseudo-homomorphic signature function,
the transmission, by the server, of the second signature data item to the client device,
said signature token being acquired based on said second signature data item using the second mask data item.

17. Authentication method according to claim 16, wherein said client device verifies the validity of the signature of said second signature data item.

18. Authentication method according to claim 4, wherein the encryption and signature functions are asymmetric functions.

19. Authentication method according to claim 18 comprising, during an initialisation phase, the implementation by the server of the following steps:
the generation of a pair of asymmetric signature keys for implementing the pseudo-homomorphic signature function;
the generation of a pair of asymmetric encryption keys for implementing the pseudo-homomorphic encryption function;
the transmission of the public encryption key of said pair of asymmetric encryption keys, and of the public signature key of said pair of asymmetric signature keys so that the client device performs the encryptions and verifies the signature tokens generated by the server using said public keys and so that the server performs the decryptions and generates the signature tokens using the private keys of said pairs of asymmetric keys.

20. Authentication method according to claim 19, wherein said encryption keys, or said signature keys, or both said encryption keys and said signature keys, are associated with an identifier identifying the client in possession of the client device.

21. Authentication method according to claim 20, wherein said encryption keys, or said signature keys, or both said encryption keys and said signature keys, are matched with an identifier identifying the client in possession of the client device in a database.

22. Authentication method according to claim 20, wherein said encryption keys, or said signature keys, or both said encryption keys and said signature keys, are derived from a hash value of the identifier identifying the client in possession of the client device.

23. Authentication method according to claim 1, wherein the authentication token is also generated using a secret user key.

24. Authentication method according to claim 23, wherein the authentication token is acquired by encryption of the secret user key and of the proof generation key P using a second pseudo-homomorphic encryption function.

25. Authentication method according to claim 24, wherein the client device also has a first encrypted token acquired by encrypting the secret user key using a first pseudo-homomorphic encryption function and further comprising a step of transmission of said first encrypted token by the client device to the server.

26. Authentication method according to claim 25, comprising a determination step for determining a first parameter by the client device and a second encrypted token acquired by encrypting the secret user key and said first parameter using the first pseudo-homomorphic encryption function and wherein the step of transmission of the first encrypted token also comprises transmission of said second encrypted token by the client device to the server.

27. Authentication method according to claim 26, wherein:
the generation step for generating proof of knowledge of the secret element comprises the transmission of a challenge by the server to the client device, and the generation by the client device of a signature data item acquired based on the first parameter, a first hash value and the masked proof generation key, said first hash value being acquired based on the challenge received, the first encrypted token, the authentication token masked using the first mask data item and the second encrypted token,
the transmission step for transmitting, to the server by the client device, said proof of knowledge of the secret element comprises the transmission, by the client device, of said signature data item to the server.

28. Authentication method according to claim 27, wherein the verification steps for verifying, by the server, the validity of the masked authentication token received and the validity of the proof of knowledge comprise:
the calculation of a second hash value based on the challenge, the first encrypted token, the masked authentication token and the second encrypted token received;
the calculation of a first decrypted token by decryption of the first encrypted token using the first pseudo-homomorphic encryption function;
the calculation of a proof verification key by decryption of the masked authentication token using the second pseudo-homomorphic encryption function;
the calculation of a second decrypted token by decryption of the second encrypted token using the first pseudo-homomorphic encryption function;
the verification of the validity of the masked authentication token received and the proof of knowledge based on the signature data item received, the first decrypted token, the second decrypted token, the second hash value and the proof verification key.

29. A non-transitory computer-readable storage medium comprising code instructions for authenticating a client device to a server using a secret element, wherein the secret element is a data item which is not stored in memory,
said client device having an authentication token generated by means of a pseudo-homomorphic function and based on said secret element, said authentication token being stored in a memory which is accessible by the client device, but not by the server device, by executing the following steps:
generation, by the client device, of a proof of knowledge of the secret element based on a proof generation key which is masked with a first mask data item, said first mask data item being a non-public, random data item known only by the client device and said masked proof generation key being dependent on said secret element, transmission to the server device by the client device, of said generated proof of knowledge of the secret element, transmission to the server by the client device, of the authentication token, masked using the first mask data item, verification by the server of validity of the received masked authentication token, verification by the server of validity of the proof of knowledge by a zero-knowledge proof, proving knowledge of said secret element by the client device without revealing said secret element to the server device.

30. System comprising:

at least one client device and a client device authentication server using a secret element known only by the client device, wherein the secret element is a data item which is not stored in memory, said client device having an authentication token generated by means of a pseudo-homomorphic function and based on said secret element, said authentication token being stored in a memory which is accessible by the client device, but not by the client device authentication server, said client device being configured to:

hold an authentication token generated by means of a pseudo-homomorphic function and based on said secret element, generate a proof of knowledge of the secret element based on a proof generation key masked with a first mask data item, said first mask data item being a non-public, random data item known only by the client device and said masked proof generation key being dependent on said secret element, transmit to the server said proof of knowledge of the secret element generated, transmit to the server the authentication token masked using the first mask data item, said server being configured to:

receive said proof of knowledge of the secret element, generated based on the proof generation key masked with a first mask data item, and transmitted by the client device, receive the authentication token masked using the first mask data item, verify the validity of the masked authentication token received, verify the validity of the proof of knowledge by a zero-knowledge proof, proving the knowledge of said secret element by the client device without revealing it.

* * * * *